United States Patent
Ishizaka

(10) Patent No.: US 11,480,354 B2
(45) Date of Patent: Oct. 25, 2022

(54) AIR-CONDITIONING MANAGEMENT SYSTEM, AIR CONDITIONER, AIR-CONDITIONING MANAGEMENT DEVICE, AIR-CONDITIONING MANAGEMENT METHOD, AND PROGRAM

(71) Applicant: Mitsubishi Electric Corporation, Tokyo (JP)

(72) Inventor: Taichi Ishizaka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 270 days.

(21) Appl. No.: 16/755,956

(22) PCT Filed: Nov. 15, 2017

(86) PCT No.: PCT/JP2017/041136
§ 371 (c)(1),
(2) Date: Apr. 14, 2020

(87) PCT Pub. No.: WO2019/097613
PCT Pub. Date: May 23, 2019

(65) Prior Publication Data
US 2021/0190357 A1 Jun. 24, 2021

(51) Int. Cl.
*F24F 11/49* (2018.01)
*F24F 13/22* (2006.01)
(Continued)

(52) U.S. Cl.
CPC .............. *F24F 11/49* (2018.01); *F24F 11/52* (2018.01); *F24F 13/222* (2013.01); *G06T 7/001* (2013.01)

(58) Field of Classification Search
CPC .......... F24F 11/49; F24F 11/52; F24F 13/222; F24F 11/50; F24F 11/61; F24F 11/54; F24F 11/62; F24F 11/89; G06T 7/001
See application file for complete search history.

(56) References Cited

U.S. PATENT DOCUMENTS 6,813,043 B1 * 11/2004 Mizuyama ............... H04N 1/52
358/521
9,816,719 B2 * 11/2017 Bergman ........... G05D 23/1904
(Continued)

FOREIGN PATENT DOCUMENTS

JP 2003-194386 A 7/2003
JP 2005-283057 A 10/2005
(Continued)

OTHER PUBLICATIONS

Extended European Search Report dated Oct. 1, 2020 in the corresponding EP patent application No. 17932028.8.
(Continued)

*Primary Examiner* — Ramesh B Patel
(74) *Attorney, Agent, or Firm* — Posz Law Group, PLC

(57) ABSTRACT

An air conditioner includes a camera to capture an image of a drain pan inside the air conditioner. An air-conditioning management device acquires, from the air conditioner, captured image information indicating an image of the drain pan captured by the air conditioner. The air-conditioning management device compares the captured image information with reference image information indicating a captured image of the drain pan used as a reference to calculate a dirtiness degree. The air-conditioning management device transmits, to a monitoring terminal, information useful for monitoring of the drain pan, such as the capture image information, information indicating the dirtiness degree, and the like.

17 Claims, 23 Drawing Sheets

(51) Int. Cl.
*F24F 11/52* (2018.01)
*G06T 7/00* (2017.01)

(56) References Cited

U.S. PATENT DOCUMENTS

| | | | | |
|---|---|---|---|---|
| 10,509,377 | B2* | 12/2019 | Willette | G05B 15/02 |
| 10,571,903 | B2* | 2/2020 | Simons | G01M 99/005 |
| 10,901,373 | B2* | 1/2021 | Locke | G05B 23/0216 |
| 11,214,386 | B2* | 1/2022 | Tajika | H04W 88/08 |
| 2016/0281348 | A9* | 9/2016 | Karamanos | F24F 7/04 |
| 2020/0173670 | A1* | 6/2020 | Suzuki | F24F 11/32 |
| 2020/0248924 | A1* | 8/2020 | Suzuki | F24F 11/38 |
| 2021/0131690 | A1* | 5/2021 | Suzuki | F24F 1/0073 |
| 2022/0064211 | A1* | 3/2022 | Sota | B01J 20/24 |

FOREIGN PATENT DOCUMENTS

| | | | |
|---|---|---|---|
| JP | 2005-292066 A | 10/2005 | |
| JP | 2007-046864 A | 2/2007 | |
| JP | 2007-255757 A | 10/2007 | |
| JP | 2007-255840 A | 10/2007 | |
| WO | 00/60633 A1 | 10/2000 | |

OTHER PUBLICATIONS

International Search Report dated Jan. 23, 2018 issued in the corresponding International Application No. PCT/JP2017/041136 (and English translation).
Office Action dated Jun. 30, 2020 issued in corresponding JP patent application No. 2019-554101 (and English translation).
Office Action dated Oct. 27, 2020 issued for the corresponding JP patent application No. 2019-554101 (and English translation).
Office Action dated Nov. 5, 2021, issued in corresponding CN Patent Application No. 201780096119.5 (and English Machine Translation).
Office Action dated Dec. 21, 2020 issued in corresponding CN patent application No. 201780096119.5 (and English translation).
Chinese Office Action dated Jun. 11, 2021, issued in corresponding CN Patent Application No. 201780096119.5 (and English Machine Translation).
Rejection Decision dated Mar. 15, 2022, in corresponding CN patent application No. 201780096119.5 (with English translation).

* cited by examiner

FIG. 9

| ADDRESS | OPERATION / STOPPAGE | THERMOSTAT ON/OFF | OPERATION MODE | SETTING TEMPERATURE | ROOM TEMPERATURE |
|---|---|---|---|---|---|
| 2a | IN OPERATION | ON | HEATING | 22°C | 19°C |
| 2b | IN OPERATION | ON | HEATING | 22°C | 20°C |
| 2c | IN OPERATION | ON | COOLING | 25°C | 25°C |
| 2d | STOP | - | - | - | 15°C |

| ADDRESS | OPERATING PERIOD | COOLING OPERATION TIME | HEATING OPERATION TIME |
|---|---|---|---|
| 2a | 823 HOURS | 480 HOURS | 319 HOURS |
| 2b | 823 HOURS | 476 HOURS | 317 HOURS |
| 2c | 2008 HOURS | 2008 HOURS | 0 HOUR |
| 2d | 30 HOURS | 26 HOURS | 0 HOUR |

| ADDRESS | ROOM | GROUP | VENTILATION-INTERLOCKED DEVICE | FLOOR | COORDINATE |
|---|---|---|---|---|---|
| 2a | SALES DEPARTMENT | ⋮ | VENTILATION FAN A | ⋮ | ⋮ |
| 2b | DEVELOPMENT DEPARTMENT | ⋮ | VENTILATION FAN B | ⋮ | ⋮ |
| 2c | SERVER ROOM | ⋮ | TOTAL HEAT EXCHANGER C | ⋮ | ⋮ |
| 2d | STOREROOM | ⋮ | VENTILATION FAN D | ⋮ | ⋮ |

| IMAGING DATE AND TIME | ADDRESS | CAPTURED IMAGE | REFERENCE FLAG | DIRTINESS DEGREE | CLEANING DATE AND TIME |
|---|---|---|---|---|---|
| 2017.8.20 21:30 | 2a | ... | ON | LOW | 2017.8.20 20:45 |
| 2017.8.20 21:30 | 2b | ... | ON | LOW | 2017.8.20 20:51 |
| 2017.8.20 21:30 | 2c | ... | ON | LOW | 2017.8.20 21:16 |
| 2017.8.20 21:30 | 2d | ... | ON | LOW | 2017.8.20 20:37 |
| ... | ... | ... | ... | ... | ... |
| 2017.11.1 13:30 | 2a | ... | - | INTERMEDIATE | 2017.8.20 20:45 |
| 2017.11.1 13:30 | 2b | ... | - | INTERMEDIATE | 2017.8.20 20:51 |
| 2017.11.1 13:30 | 2c | ... | - | HIGH | 2017.8.20 21:16 |
| 2017.11.1 13:30 | 2d | ... | - | LOW | 2017.8.20 20:37 |

FIG. 13

| ADDRESS | IMAGING CONDITION |
|---|---|
| 2a, 2b, 2c, 2d | START TIME OF FIRST OPERATION AFTER COMPLETION OF CLEANING |
| 2c | 5:30 13:30 21:30 EVERY DAY |
| 2a, 2b, 2d | 13:30 EVERY DAY |
| 2a, 2b | END TIME OF OPERATION |
| ..... | ..... |

313

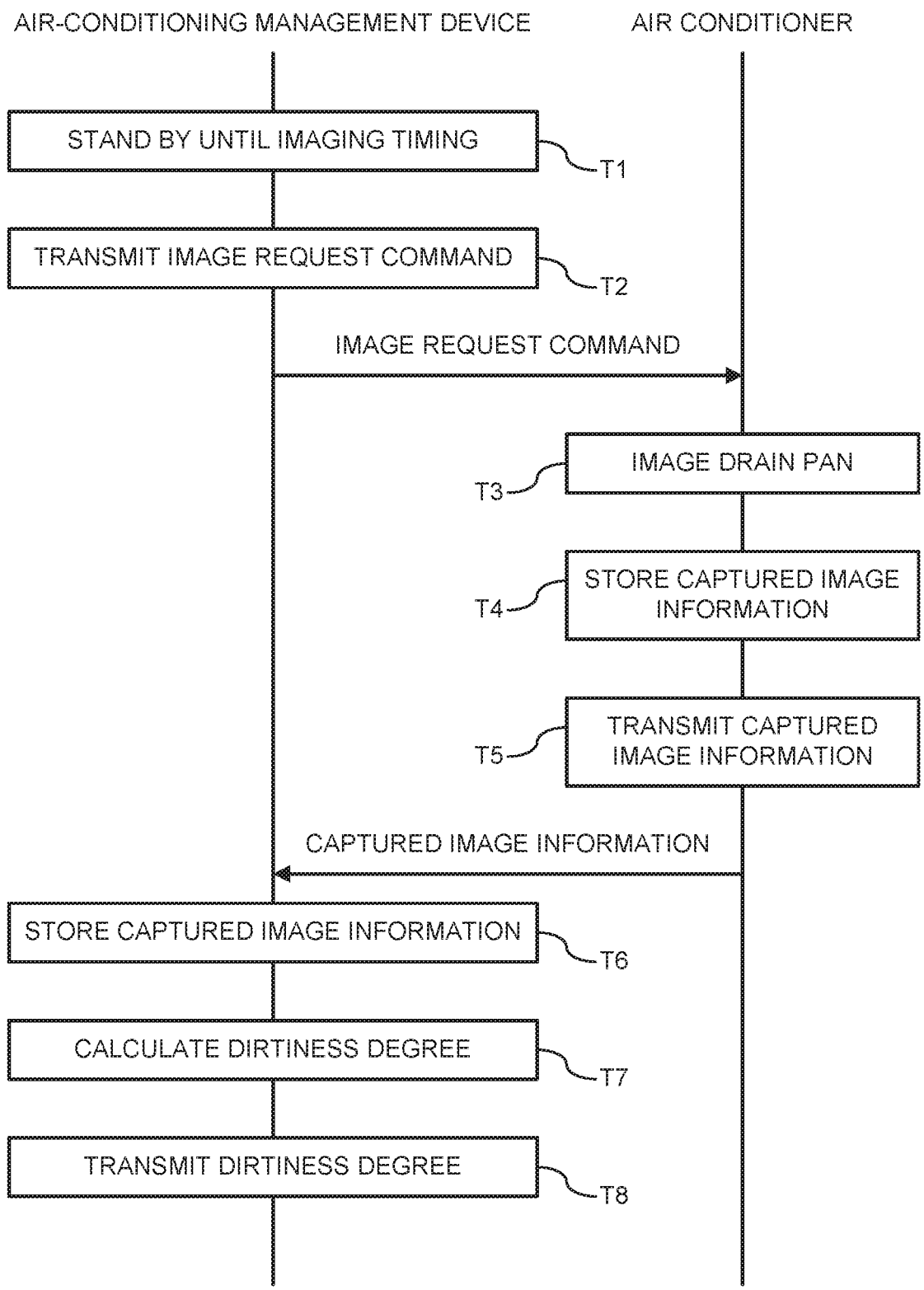

FIG. 16

| MONITORING OF DRAIN PAN | SCHEDULE | OPERATING STATE |

LIST | FLOOR PLAN

DIRTINESS: HIGH

| ADDRESS | FLOOR | ROOM | | CLEANING DATE AND TIME |
|---|---|---|---|---|
| 2c | SECOND FLOOR | SERVER ROOM | CHECK IMAGE | 2017.8.20 21:16 |

DIRTINESS: INTERMEDIATE

| ADDRESS | FLOOR | ROOM | | CLEANING DATE AND TIME |
|---|---|---|---|---|
| 2a | FIRST FLOOR | SALES DEPARTMENT | CHECK IMAGE | 2017.8.20 20:45 |
| 2b | FIRST FLOOR | DEVELOPMENT DEPARTMENT | CHECK IMAGE | 2017.8.20 20:51 |

DIRTINESS: LOW

| ADDRESS | FLOOR | ROOM | | CLEANING DATE AND TIME |
|---|---|---|---|---|
| 2d | SECOND FLOOR | STOREROOM | CHECK IMAGE | 2017.8.20 20:37 |

AIR-CONDITIONING MANAGEMENT SYSTEM, AIR CONDITIONER, AIR-CONDITIONING MANAGEMENT DEVICE, AIR-CONDITIONING MANAGEMENT METHOD, AND PROGRAM

CROSS REFERENCE TO RELATED APPLICATION

This application is a U.S. national stage application of PCT/JP2017/041136 filed on Nov. 15, 2017, the contents of which are incorporated herein by reference.

TECHNICAL FIELD

The present disclosure relates to an air-conditioning management system, an air conditioner, an air-conditioning management device, an air-conditioning management method, and a program.

BACKGROUND ART

When an air conditioner performs a cooling operation or a dehumidifying operation, dew condensation may occur inside the air conditioner. The air conditioner is provided with a drain pan for receiving water generated by the internal condensation and for draining the water to the outside. Since moisture remains in the drain pan, dirt due to mold, slime or the like occurs in the drain pan. If the drain pan is left dirty, there occur, for example, problems in that air discharged by the air conditioner has a bad odor, and the dirt clogs a drainage hose and causes water to leak from the air conditioner. For this reason, some countries have prescribed by law regular inspection of drain pans of air conditioners in large buildings such as office buildings and schools that are used by a large number of people. For example, monthly inspection of drain pans of air conditioners in specific buildings is prescribed by law in Japan. Also, cleaning of the drain pans as needed is prescribed.

In order to inspect and clean the drain pan, workers must disassemble the air conditioner and remove the drain pan. Since there are a large number of air conditioners in a large building, inspection of drain pans is very costly. Also, since a material that suppresses mold is used for drain pans in air conditioners in recent years, often there is no need to reclean the drain pans about one month after cleaning of the drain pans. In this case, even if the drain pans are removed from the air conditioners and inspected, the drain pans are returned to the air conditioners without cleaning the drain pans, thereby causing wasted costs.

Additionally, although home air conditioners are not subject to such legal regulation, if the drain pan is left dirty, problems such as bad odor and water leakage occur as described above. Therefore, even for the home air conditioners, periodic inspection of the drain pans and requesting a cleaning company to clean the drain pans as necessary are desirable. However, disassembling the air conditioner and inspecting the drain pan are difficult for a user. Therefore, the user cannot commission the cleaning company to clean the air conditioner at the appropriate timing.

Due to the above-described circumstances, there is a need for a technology that supports the inspection of air conditioners.

Patent Literature 1 discloses an air conditioner that determines, in accordance with a load detected from a drain motor that drives a drain pump for draining water from within a drain pan, whether cleaning of the drain pan is necessary.

CITATION LIST

Patent Literature

Patent Literature 1: Unexamined Japanese Patent Application Publication No. 2005-283057

SUMMARY OF INVENTION

Technical Problem

However, since the air conditioner disclosed in Patent Literature 1 determines the necessity of cleaning the drain pan based on the load during drainage, correct estimation of the status of occurrence of dirt due to mold, slime or the like that occurs in the drain pan is difficult.

In order to solve the aforementioned problem, an objective of the present disclosure is to provide an air-conditioning management system, an air conditioner, an air-conditioning management device, an air-conditioning management method, and a program that enable support in inspecting the air conditioner.

Solution to Problem

In order to achieve the aforementioned objective, an air-conditioning management system according to the present disclosure includes an air conditioner and an air-conditioning management device. The air conditioner includes imaging means for capturing an image of a drain pan. The air-conditioning management device includes (i) image acquisition means for acquiring, from the air conditioner via communication, captured image information indicating the image captured by the imaging means and (ii) dirtiness information output means for outputting dirtiness information based on the captured image information.

Advantageous Effects of Invention

According to the present disclosure, an image of the drain pan is captured by the imaging means with which the air conditioner is provided, thereby enabling support in inspecting the air conditioner.

BRIEF DESCRIPTION OF DRAWINGS

FIG. 9 is a diagram illustrating one example of operating state data according to Embodiment 1 of the present disclosure;

FIG. 10 is a diagram illustrating one example of operating period data according to Embodiment 1 of the present disclosure;

FIG. 11 is a diagram illustrating one example of configuration data according to Embodiment 1 of the present disclosure;

FIG. 12 is a diagram illustrating one example of drain pan data according to Embodiment 1 of the present disclosure;

FIG. 13 is a diagram illustrating one example of schedule data according to Embodiment 1 of the present disclosure;

FIG. 15 is a sequence diagram illustrating a processing flow from capture of an image of the drain pan to transmission of a dirtiness degree in the air-conditioning management system according to Embodiment 1 of the present disclosure;

FIG. 16 illustrates one example of a screen image displayed by the monitoring terminal according to Embodiment 1 of the present disclosure;

DESCRIPTION OF EMBODIMENTS

An air-conditioning management system according to the embodiments of the present disclosure is described below with reference to drawings. Components that are the same or equivalent are assigned the same reference signs throughout the drawings.

Embodiment 1

An air-conditioning management system 1 according to Embodiment 1 is a system that collectively monitors drain pans in multiple air conditioners 2 installed in a building. By collectively monitoring the drain pans in the air conditioners 2, inspection of the drain pans can be supported.

Figure 1:
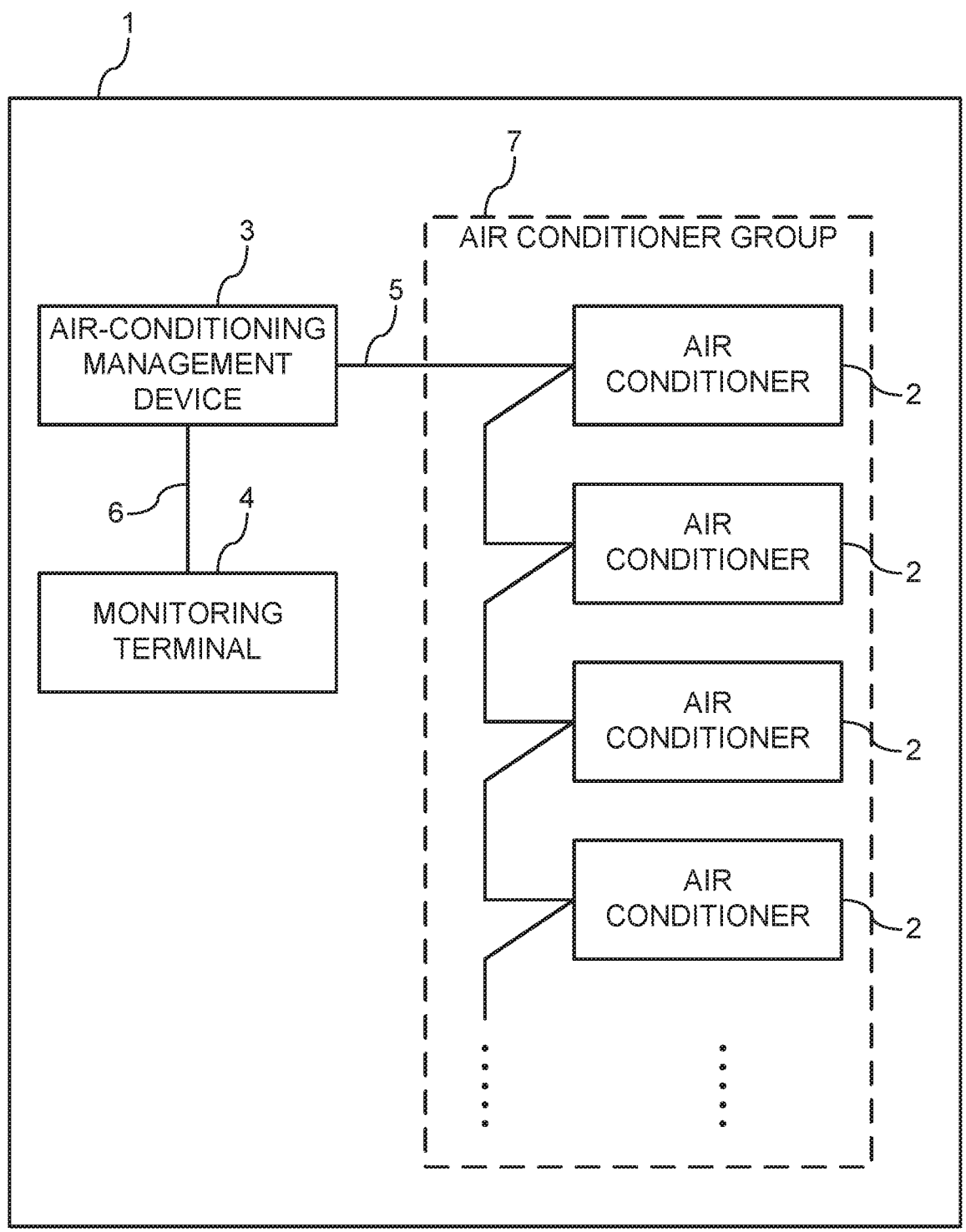
FIG. 1 is a block diagram illustrating an air-conditioning management system according to Embodiment 1 of the present disclosure.

Configuration of the air-conditioning management system 1 is described with reference to FIG. 1. The air-conditioning management system 1 includes the multiple air conditioners 2, an air-conditioning management device 3, and a monitoring terminal 4. The multiple air conditioners 2 are included in an air conditioner group 7. The number of the air conditioners 2 may be one.

Hereinafter, in the description of Embodiment 1 room configuration of a building is assumed to be the configuration illustrated in FIG. 2. On the first floor, there is a room for a sales department and a room for a development department. On the second floor, there is a server room and a storeroom. Ceiling-embedded type air conditioners 2a, 2b and 2c are installed in the room for the sales department, the room for the development department and the server room. A wall-mounted type air conditioner 2d is installed in the storeroom. Addresses 2a, 2b, 2c and 2d are assigned to the air conditioners 2a, 2b, 2c and 2d. These addresses are device addresses for specifying the air conditioners 2 on a first communication line 5.

Referring back to FIG. 1, the air conditioners 2 are devices that perform air conditioning in spaces in which the air conditioners 2 are installed, and the air conditioners 2 are, for example, indoor units. The air conditioners 2 communicate with the air-conditioning management device 3 via the first communication line 5. The first communication line 5 is, for example, a dedicated communication line used for controlling air conditioners such as an indoor unit and an outdoor unit. The air conditioners 2 operate under the control of the air-conditioning management device 3.

The air-conditioning management device 3 manages the air conditioners 2. The air-conditioning management device 3 communicates with the air conditioners 2 via the first communication line 5. Also, the air-conditioning management device 3 communicates with the monitoring terminal 4 via a second communication line 6. The second communication line 6 is, for example, a communication line such as a twisted pair cable or a coaxial cable. The second communication line 6 may be a communication channel formed by wireless communication such as IEEE 802.11 and IEEE 802.15.

The monitoring terminal 4 is a terminal for managing the air conditioners 2 by a user via the air-conditioning management device 3. The user of the monitoring terminal 4 is, for example, a manager of the building. The user operates the monitoring terminal 4, thereby enabling the user to check states of the air conditioners 2 under the control of the air-conditioning management device 3.

Figure 3:
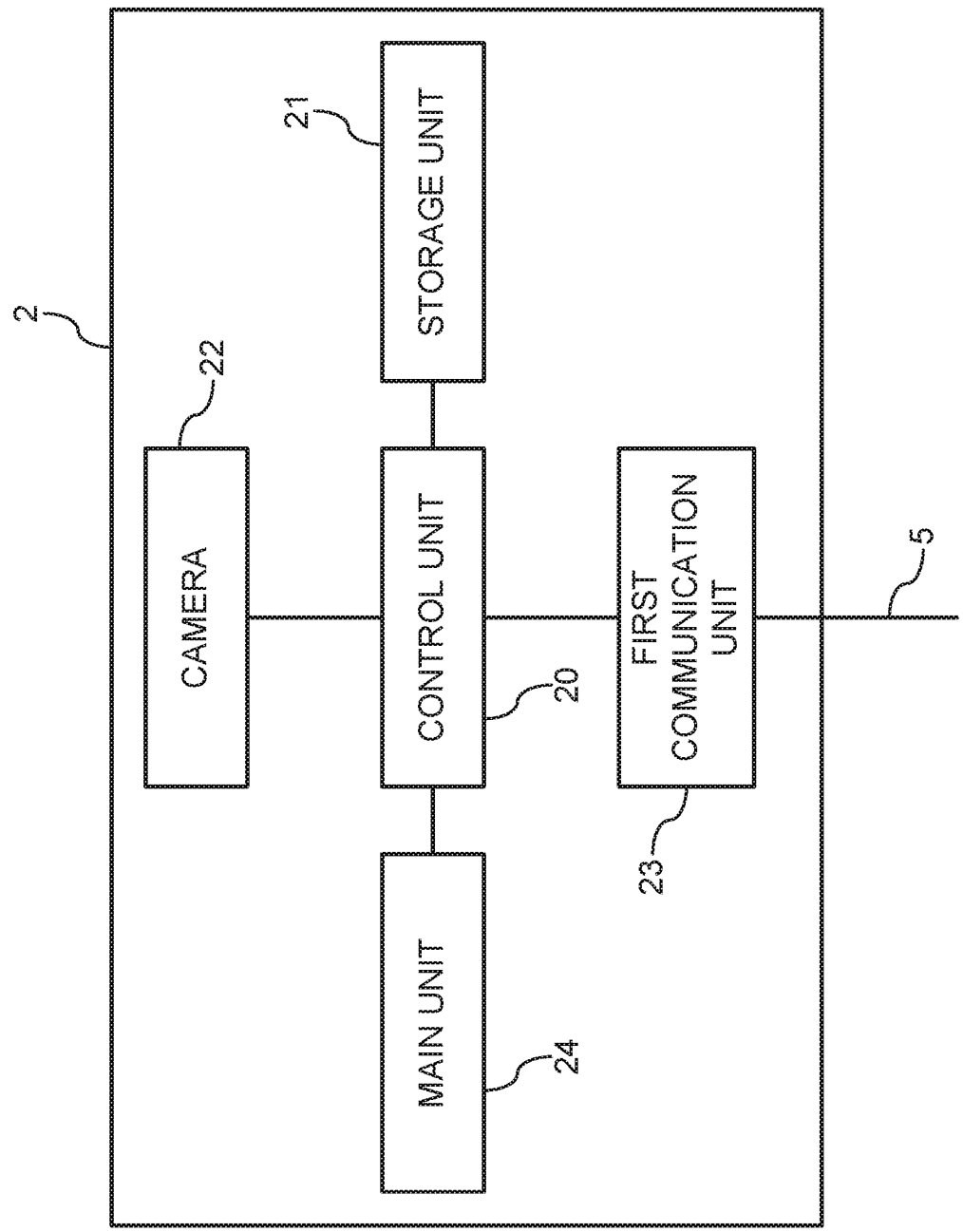
FIG. 3 is a block diagram illustrating an air conditioner according to Embodiment 1 of the present disclosure.

Configuration of the air conditioners 2 is described with reference to FIG. 3, Each air conditioner 2 includes (i) a control unit 20 to comprehensively control the air conditioner 2, (ii) a storage unit 21 to store image information on a captured image of a drain pan, (iii) a camera 22 to capture an image of the drain pan, and (iv) a first communication unit 23 to communicate with the air-conditioning management device 3 via the first communication line 5, and (v) a main unit 24. The main unit 24 is a component for realizing essential functions of general indoor units. The main unit 24 includes, for example, a fan, a heat exchanger, a temperature sensor, and the like.

The control unit 20 executes a process in accordance with a command received from the air-conditioning management device 3 via the first communication unit 23. Examples of the command include, for example, an operating control command, an operating state request command, and an image request command. The operating control command is a command to instruct the air conditioner 2 to (i) switch between operation and stoppage of the air conditioner 2, (ii) switch operation modes such as cooling, heating, dehumidification, ventilation and the like, or (iii) change a setting temperature, a setting humidity, an air volume and the like. The operating state request command is a command that requests a current operating state of the air conditioner 2 such as, for example, (i) information indicating whether the air conditioner 2 is operating or stopped, (ii) information indicating Whether a thermostat is on or off, (iii) operation modes such as cooling, heating, ventilation and the like, (iv) the setting temperature, (v) the room temperature and the like. The image request command is a command for requesting a captured image of the drain pan included in the air conditioner 2.

Figure 4:
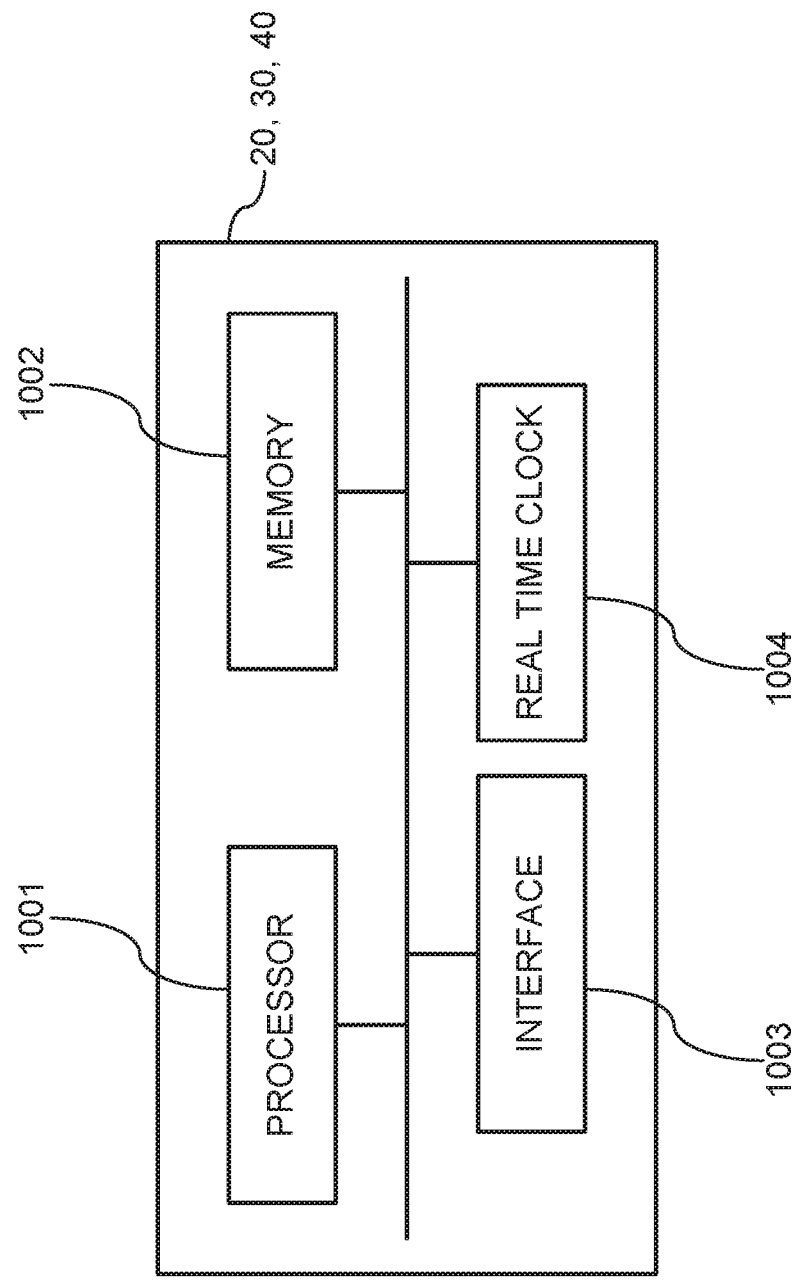
FIG. 4 is a block diagram illustrating hardware configuration of a control unit for controlling the air conditioner, an air-conditioning management device and a monitoring terminal according to Embodiment 1 of the present disclosure.

The functions of the control unit 20 are achieved by, for example, a microcontroller including a processor 1001, a memory 1002, an interface 1003, and a real time clock 1004, as illustrated in FIG. 4. The processor 1001, the memory 1002, the interface 1003, and the real time clock 1004 are mutually connected by, for example, a bus line. The processor 1001 is, for example, a central processing unit (CPU). The memory 1002 is, for example, random access memory (RAM) and read-only memory (ROM). The interface 1003 is, for example, an input/output (I/O) port. The control unit 20 is connected to the storage unit 21, the camera 22, and the first communication unit 23 through the interface 1003. The memory 1002 functions as working memory when the processor 1001 executes a process. Also, the memory 1002 also stores a control program. The processor 1001 reads and executes the control program stored in the memory 1002 when the air conditioner 2 is started. The functions of the control unit 20 are realized by the processor 1001 executing the control program. The control unit 20 can acquire the current time from the real time clock 1004 during image capture.

Also, a part of or all of the functions of the control unit 20 may be realized by a dedicated circuit using an application specific integrated circuit (ASIC), a field-programmable gate array (FPGA) or the like.

Referring back to FIG. 3, the storage unit 21 includes a storage device such as an electrically erasable programmable read-only memory (EEPROM), a flash memory, and a hard disk drive. The storage unit 21 stores, under control of the control unit 20, captured image information in which information indicating an image of the drain pan captured by the camera 22 is associated with a date and time at which the image is captured. The storage unit 21 may store only the latest captured image information, or may store the captured image information as a time series.

Figure 5:
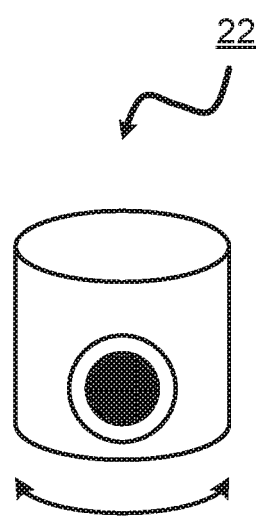
FIG. 5 illustrates one example of a camera included in the air conditioner according to Embodiment 1 of the present disclosure.

The camera 22 is, for example, a rotatable camera illustrated in FIG. 5. By using a rotatable camera, even if the camera is installed near the drain pan, the whole of the drain pan can be imaged. The camera 22 captures an image of the drain pan under the control of the control unit 20. The camera 22 outputs, to the control unit 20, information indicating the image obtained during the image capture.

Figure 6:
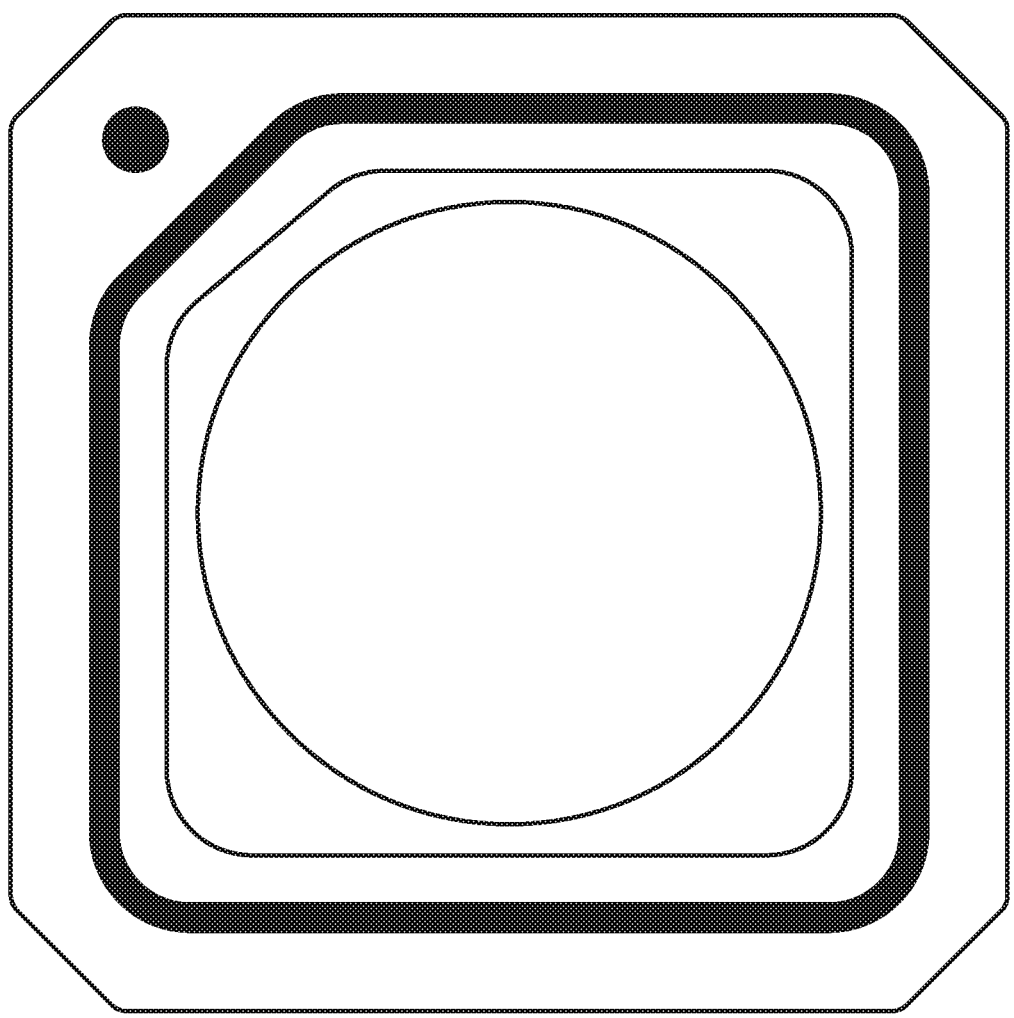
FIG. 6 illustrates a captured image of a drain pan to which no dirt is attached.
Figure 7:
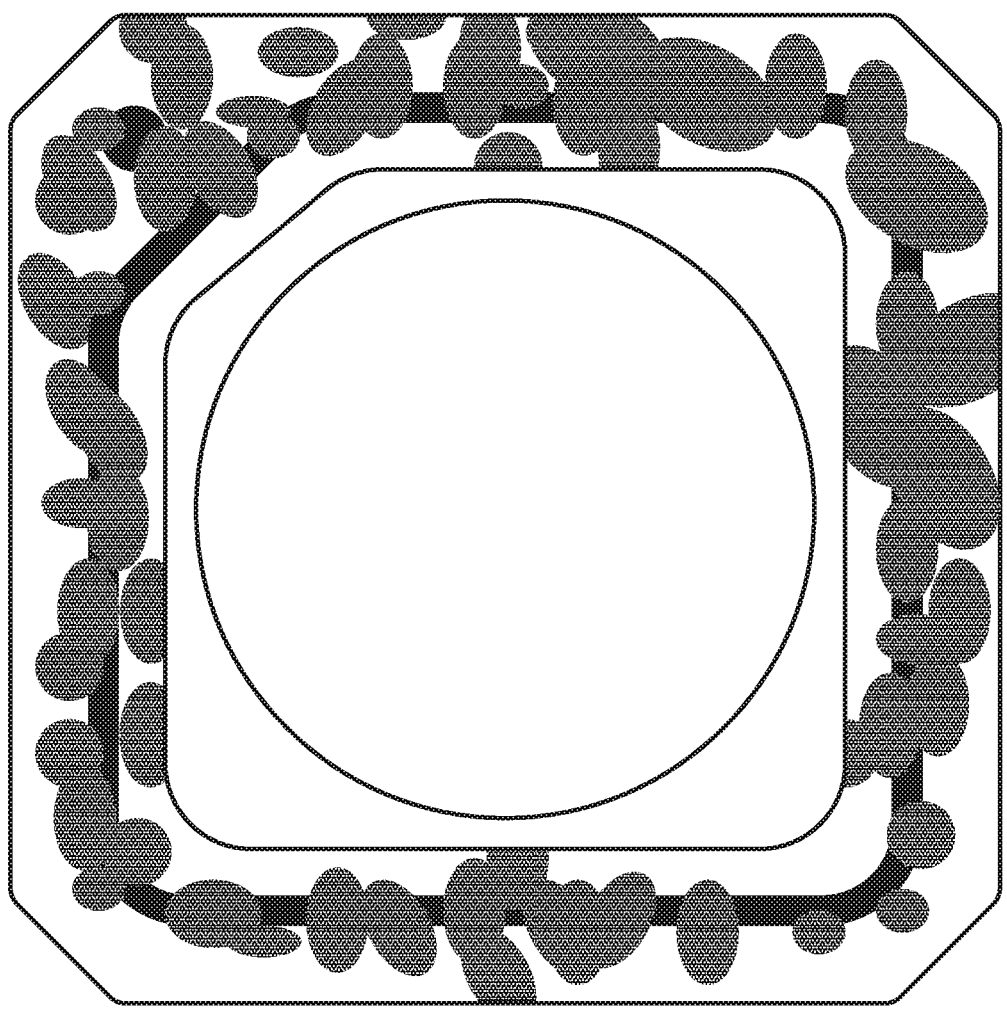
FIG. 7 illustrates a captured image of the drain pan to which a large amount of dirt is attached.

FIGS. 6 and 7 illustrate examples of the images obtained when the drain pans in the ceiling-embedded type air conditioners 2 are imaged. FIG. 6 illustrates an image obtained when the drain pan to which no dirt is attached is imaged. FIG. 7 is an image obtained when the drain pan to which a lot of dirt such as mold and slime is attached is imaged. Although only one image of the drain pan is illustrated in this example, multiple portions of the drain pan are imaged since the camera 22 can rotate. Therefore, the captured image of the drain pan is actually represented by a combination of multiple images or an image obtained by synthesizing the multiple images.

The camera 22 is optionally a non-rotatable camera. For example, a rail may be provided near the drain pan and a camera capable of horizontally moving along the rail may be used. Alternatively, the whole of the drain pan may be imaged by installing multiple cameras. Alternatively, by providing a sufficient space for image capture around the drain pan, the whole of the drain pan can be imaged despite the use of a single camera that cannot be rotated or moved.

Referring back to FIG. 3, the first communication unit 23 receives a command from the air-conditioning management device 3 and outputs the received command to the control unit 20. Also, the first communication unit 23 (i) acquires, from the control unit 20, information indicating an operating state (hereinafter, referred to as operating state information) and the captured image information and (ii) transmits the information to the air-conditioning management device 3.

The above-described air conditioner 2 may be said to be provided with imaging means that captures an image of the drain pan. The control unit 2C) controls the camera 22 to capture an image of the drain pan in the air conditioner 2, thereby realizing the functions of the imaging means.

Also, the above-described air conditioner 2 may be said to be provided with image output means that outputs the information indicating the captured image of the drain pan. The control unit 20 transmits the captured image information to the air-conditioning management device 3, thereby realizing the function of the image output means.

Figure 8:
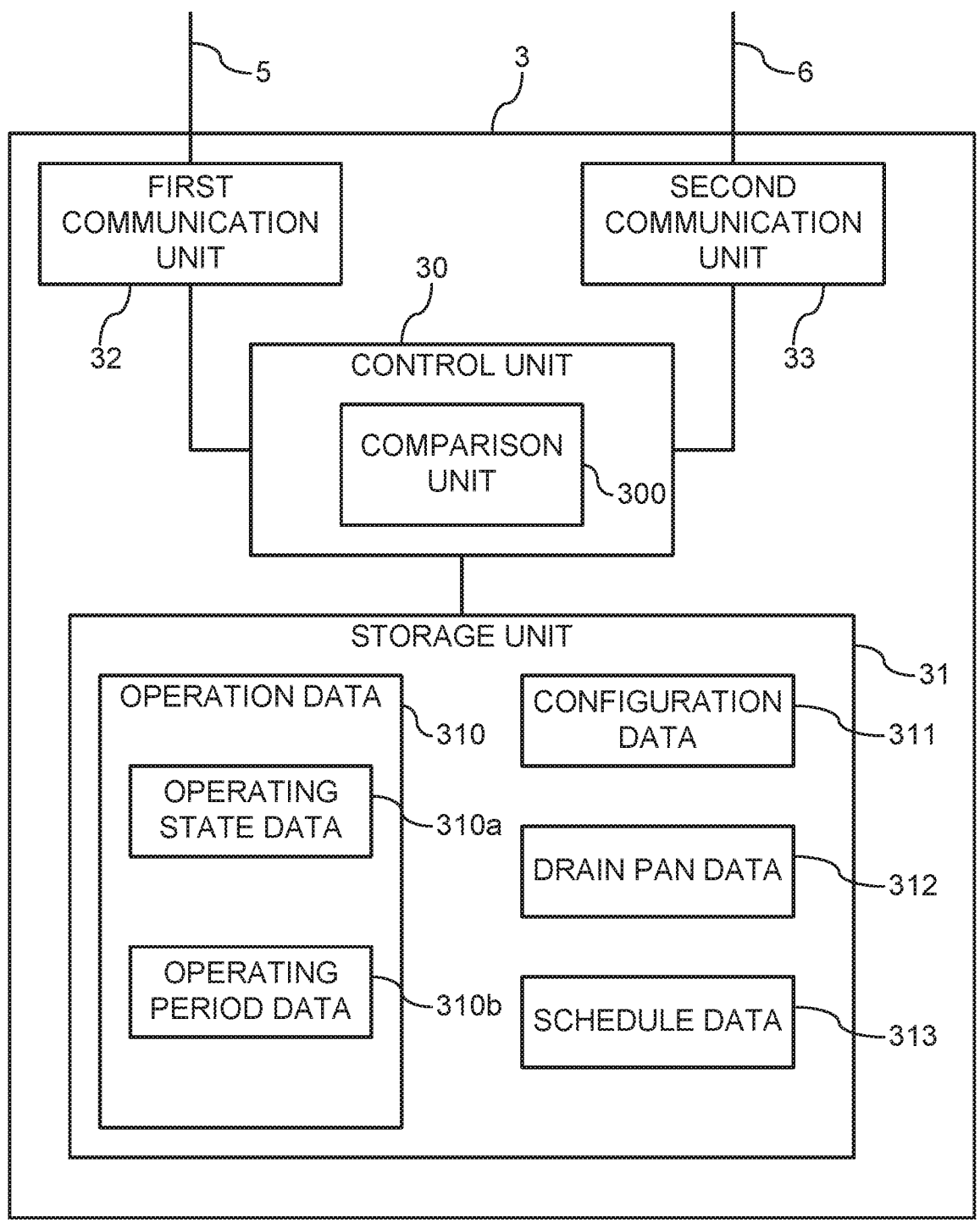
FIG. 8 is a block diagram illustrating the air-conditioning management device according to Embodiment 1 of the present disclosure.

Configuration of the air-conditioning management device 3 is described with reference to FIG. 8. The air-conditioning management device 3 includes (i) a control unit 30 to control each component of the air-conditioning management device 3, (ii) a storage unit 31 to store various data, (iii) a first communication unit 32 to communicate with the air conditioner 2 via the first communication line 5, and (iv) a second communication unit 33 to communicate with the monitoring terminal 4 via the second communication line 6.

The control unit 30 transmits the operating control command to the air conditioner 2 via the first communication unit 32 to control the air conditioner 2. The control unit 30 uses the address assigned to the air conditioner 2 to specify the air conditioner 2 that is the target of communication.

The control unit 30 transmits, to the air conditioner 2 via the first communication unit 32, the operating state request command and the image request command, thereby acquiring the operating state information and the captured image information from the air conditioner 2. When the control unit 30 receives a request for information from the monitoring terminal 4 via the second communication unit 33, the control unit 30 transmits, to the monitoring terminal 4, information depending on the request. For example, when there is a request from the monitoring terminal 4 for information on dirt in the drain pan, the control unit 30 transmits, to the monitoring terminal 4, dirtiness information indicating the dirt in the drain pan. The dirtiness information is information representing, for example, a dirtiness degree indicating a degree of dirtiness of the drain pan in three grades of high, middle and low. Also, the dirtiness degree may be expressed in two grades of "cleaning necessary" and "cleaning unnecessary". Alternatively, the dirtiness degree may be expressed, for example, on a scale of 1 to 100. The calculation of the dirtiness degree is described later.

The control unit 30 reads and writes data stored in the storage unit 31 and controls and manages the air conditioner 2. Details of the data stored in the storage unit 31 are described later. For example, the control unit 30 refers to schedule data 313 stored in the storage unit 31 and transmits the image request command to the air conditioner 2 at timings defined in the schedule data 313.

The control unit 30 includes a comparison unit 300 to acquire the dirtiness degree by comparing (i) reference image information stored in the storage unit 31 and indicating a reference image of the drain pan as a reference and (ii) the captured image information acquired from the air conditioner 2. As described later, for example, information indicating an image of drain pan immediately after cleaning the drain pan is used for the reference image information. For example, the comparison unit 300 (i) extracts difference pixels in which there is a difference between the reference image information and the captured image information and (ii) calculates the dirtiness degree based on the number of difference pixels.

The functions of the control unit 30 are realized by a computer, for example, such as a personal computer or a microcontroller, that includes a processor 1001, a memory 1002, an interface 1003, and a real time clock 1004 illustrated in FIG. 4. The processor 1001, the memory 1002, the interface 1003, and the real time clock 1004 are mutually connected by, for example, a bus line. The processor 1001 is, for example, a CPU. The memory 1002 is, for example, a RANI and a ROM. The interface 1003 is, for example, an I/O port. The control unit 30 is connected, via the interface 1003, to the storage unit 31, the first communication unit 32, and the second communication unit 33. The memory 1002 functions as working memory when the processor 1001 executes a process. Also, the memory 1002 stores a control program. The processor 1001 reads and executes the control program stored in the memory 1002 when the air-conditioning management device 3 is started. The functions of the control unit 30 are realized by the processor 1001 executing the control program.

A part of or all of the functions of the control unit 30 may be realized by a dedicated circuit using an ASIC, an FPGA or the like.

Referring back to FIG. 8, the storage unit 31 stores (i) operation data 310 including information on the operating state and the operating period of the air conditioner 2. (ii) configuration data. 311 including information on system configuration such as the addresses of the air conditioners 2 and positions at which the air conditioners 2 are installed, (iii) drain pan data 312 including information on drain pans such as the captured image information and information on cleaning date and time, and (iv) schedule data 313 including information defining timing at which the drain pans are imaged. The operation data 310 includes operating state data 310a and operating period data 310b. The storage unit 31 includes storage devices such as an EEPROM, a flash memory, or a hard disk drive. Hereinafter, data stored in the storage unit 31 is described with reference to the drawings.

The operating state data 310a is represented, for example, by a table illustrated in FIG. 9. The operating state data 310a includes (i) an address field indicating the address of the air conditioner 2, (ii) an operation/stoppage field indicating whether the air conditioner 2 is currently operated or stopped, (iii) a thermostat on/off field indicating whether a thermostat of the air conditioner 2 is currently turned on or off, (iv) an operation mode field indicating a current operation mode field of the air conditioner 2 such as a cooling anode and a heating mode, (v) a setting temperature field indicating a current setting temperature of the air conditioner 2, and (vi) a room temperature field indicating a current room temperature of a room in which the air conditioner 2 is installed.

In the example illustrated in FIG. 9, for example, the air conditioners 2a and 2b perform the heating operation at a setting temperature of 22° C., the air conditioner 2c performs the cooling operation at a setting temperature of 25° C., and the air conditioner 2d is out of operation, as seen from FIG. 9. As seen from FIG. 9, the room temperature of the room in which the air conditioner 2a is installed is 19° C., the room temperature of the room in which the air conditioner 2b is installed is 20° C., the room temperature of the room in which the air conditioner 2c is installed is 25° C., and the room temperature of the room in which the air conditioner 2d is installed is 15° C.

Upon acquiring the operating state information from the air conditioner 2, the control unit 30 updates a record corresponding to the air conditioner 2 in the operating state data 310a, that is, the operation/stoppage field, the thermostat on/off field, the operation mode field, the setting temperature field, and the room temperature field.

The operating period data 310b is represented, for example, by a table illustrated in FIG. 10. The operating period data 310b includes (i) the address field indicating the address of the air conditioner 2, (ii) an operating period field indicating the total of the operating period from the latest cleaning time, (iii) a cooling operation time field indicating the total of a cooling operation time period from the latest cleaning time, and (iv) a heating operation time field indicating the total of a heating operation time period from the latest cleaning time. The cooling operation time is a time during which the thermostat is on and cold air is being blown. The heating operation time is a time during which the thermostat is on and hot air is being blown.

In the example illustrated in FIG. 10, for example, an operating period of each of the air conditioners 2a and 2b is 823 hours, and the cooling operation time and the heating operation time can be understood to be slightly different between the air conditioners 2a and 2b. Also, since an operating period of the air conditioner 2c is equal to a cooling operation time of the air conditioner 2c, cooling is understood to always be performed during operation of the air conditioner 2c. Also, an operating period of the air conditioner 2d is understood to be very short in comparison to the operating periods of the air conditioners 2a, 2h and The control unit 30 constantly monitors the air conditioner 2, for example, as to whether the air conditioner 2 is currently in operation, whether the air conditioner 2 currently performs the cooling operation, and whether the air conditioner 2 currently-performs the heating operation. The control unit 30 updates the operating period field, the cooling operation time field and the heating operation time field every one minute.

The configuration data 311 is represented, for example, by a table illustrated in FIG. 11. The configuration data 311 includes (i) the address field indicating the address of the air conditioner 2, (ii) a room field indicating the name of the room in which the air conditioner 2 is installed, (iii) a group field indicating an operation group to which the air conditioner 2 belongs, (iv) a ventilation-interlocked device field indicating a ventilator that operates in conjunction with the air conditioner 2, (v) a floor field indicating a plan view of a floor of the room in which the air conditioner 2 is installed, and (vi) a coordinate field indicating a coordinate at which the air conditioner 2 is installed. The configuration data 311 is set, for example, when the air conditioner 2 is installed.

Figure 18:
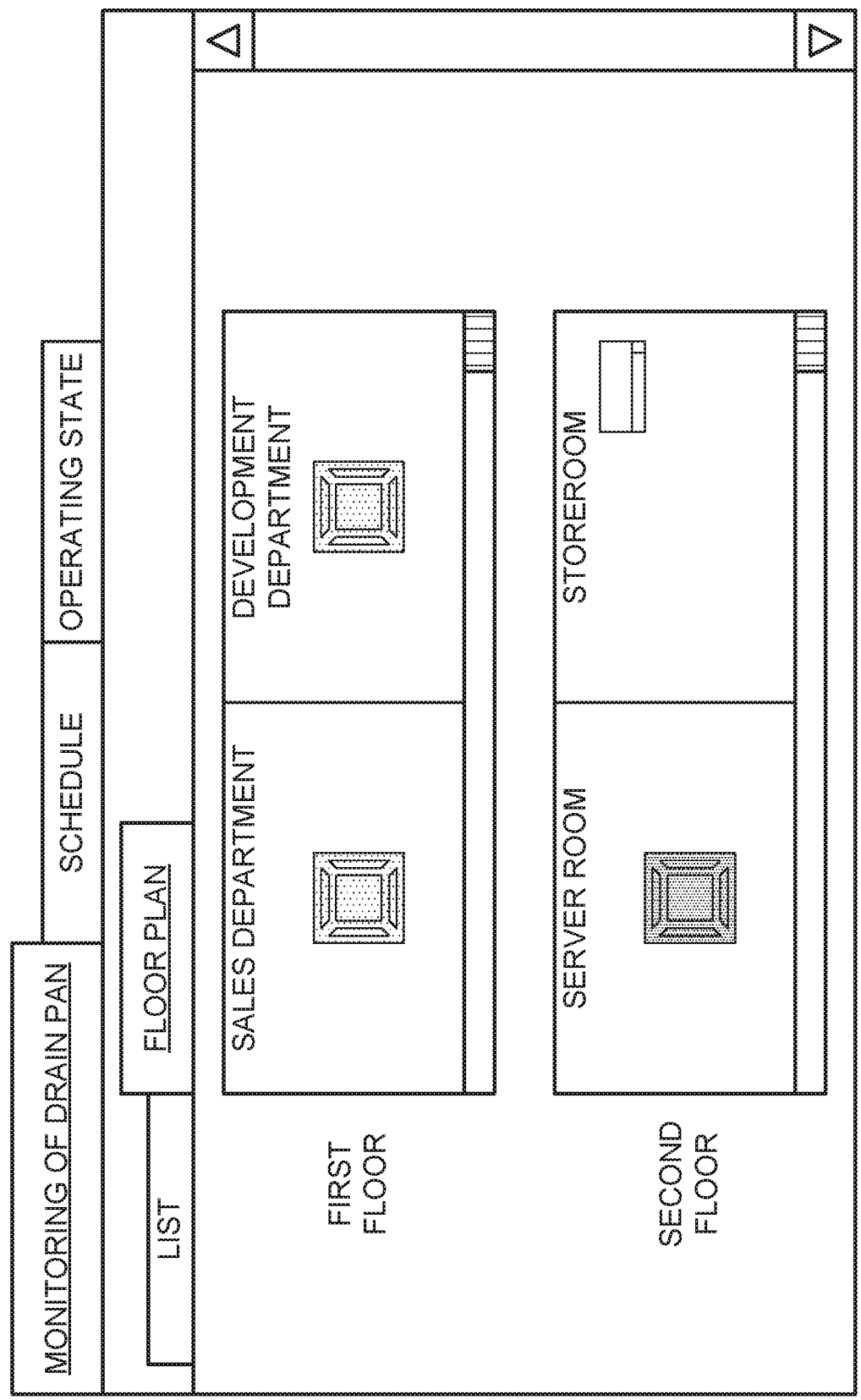
FIG. 18 illustrates one example of a floor plan displayed by the monitoring terminal according to Embodiment 1 of the present disclosure.

For example, when the air-conditioning management device 3 is started up, the control unit 30 activates the ventilator indicated by the ventilation-interlocked device field in conjunction with the activation of the air conditioner 2. Also, for example, the control unit 30 transmits the configuration data 311 to the monitoring terminal 4. The monitoring terminal 4 displays information on the air conditioner 2 based on the received configuration data 311. For example, as illustrated in FIG. 18, when the floor plan is displayed, the monitoring terminal 4 can display an icon of the air conditioner 2 at the coordinate corresponding to the position at which the air conditioner 2 is installed.

In addition to the fields described above, the configuration data 311 may include a field indicating a model name of the air conditioner 2, a field indicating a model type of the air conditioner 2 such as a ceiling-embedded type or a wall-mounted type, a field indicating an installation date of the air conditioner 2, and the like.

The drain pan data 312 is represented, for example, by a table illustrated in FIG. 12. The drain pan data 312 includes (i) an imaging date and time field indicating a date and time at which the drain pan is imaged, (ii) the address field indicating the address of the air conditioner 2, (iii) a captured image field indicating a captured image of the drain pan, (iv) a reference flag field indicating whether the captured image is used as a reference image described later, (v) a dirtiness degree field indicating the dirtiness degree of the drain pan, and (vi) a cleaning date field indicating the latest date and time at which cleaning of the drain pan is performed.

For example, upon acquiring the captured image information from the air conditioner 2, the control unit 30 updates the imaging date and time field and the captured image field. For example, when the user inputs, to the monitoring terminal 4, the cleaning date and time of the air conditioner 2 and the monitoring terminal 4 transmits the cleaning date and time information, the control unit 30 updates the cleaning date and time field based on the cleaning date and time information received from the monitoring terminal 4. The control unit 30 enables the reference flag field, for example, when the control unit 30 acquires the captured image information for the first time after cleaning of the drain pan. For example, the control unit 30 (i) compares the captured image information and the reference image information for the identical air conditioner 2 to calculate the dirtiness degree and (ii) updates the dirtiness degree field. The reference image information is information that (i) is used during calculation of the dirtiness degree and (ii) indicates a reference image to be compared with the captured image information. For example, in the drain pan data 312, captured image information stored in a captured image field in a record in which the reference flag field is enabled serves as reference image information. The comparison between the captured image information and the reference image information is described later.

The schedule data 313 is represented, for example, by a table illustrated in FIG. 13. The schedule data 313 includes (i) the address field indicating the address of the air conditioner 2 and (ii) an imaging condition field indicating timing at which the drain pan is imaged. For example, when the user operates the monitoring terminal 4 to set an imaging schedule and the monitoring terminal 4 transmits setting data to the air-conditioning management device 3, the control unit 30 updates the schedule data 313 based on the setting data received from the monitoring terminal 4. The control unit 30 transmits the image request command to the air conditioner 2 when the imaging condition set in the schedule data 313 is satisfied.

Referring back to FIG. 8, the first communication unit 32 acquires a command from the control unit 30 and transmits the command to the air conditioner 2. The first communication unit 32 (i) receives, from the air conditioner 2, the operating state information and the captured image information and (ii) outputs the information to the control unit 30.

The second communication unit 33 acquires, from the control unit 30, information to be displayed on the monitoring terminal 4 and (ii) transmits the information to the monitoring terminal 4. The information to be displayed on the monitoring terminal 4 is, for example, (i) information indicating the plan view of the floor, (ii) information indicating the position at which the air conditioner 2 is installed, (iii) information indicating a state of the air conditioner 2 such as the operating state, the operating period or the like, (iv) the captured image information of the drain pan in the air conditioner 2, (v) information indicating the dirtiness degree of the drain pan, and the like.

The second communication unit 33 (i) receives, from the monitoring terminal 4, operation information indicating a user's operation and (ii) outputs the operation information to the control unit 30. The user's operation is, for example, (i) an operation related to control of the air conditioner 2, (ii) an input operation to input the cleaning date and time, (iii) a check operation to check a captured image of the drain pan, and (iv) a setting and change operation to set or change an imaging schedule of the drain pan.

The above-described air-conditioning management device 3 can be said to include (i) image acquisition means for acquiring, from the air conditioner 2 via communication, captured image information indicating the captured image of the drain pan and (ii) dirtiness information output means for outputting the dirtiness information based on the captured image information. The control unit 30 receives the captured image information from the air conditioner 2 via the first communication unit 32, thereby realizing the functions of the image acquisition means. The comparison unit 300 compares the captured image information with the reference image information to calculate the dirtiness degree, and the control unit 30 transmits, to the monitoring terminal 4 via the second communication unit 33, information indicating the dirtiness degree, thereby realizing the functions of the dirtiness information output means.

Also, the above-described air-conditioning management device 3 can be said to further include storage means for storing the reference image information indicating the reference image of the drain pan used as a reference. The control unit 30 stores, in the drain pan data 312 of the storage unit 31, captured image information obtained when the drain pan is imaged for the first time after cleaning the drain pan, thereby realizing the functions of the storage means. Additionally, as described above, since the comparison unit 300 compares the captured image information with the reference image information to calculate the dirtiness degree, and the control unit 30 transmits, to the monitoring terminal 4, the information indicating the dirtiness degree, the dirtiness information output means can be said to output the dirtiness information based on a result of the comparison between the captured image information and the reference image information.

Figure 14:
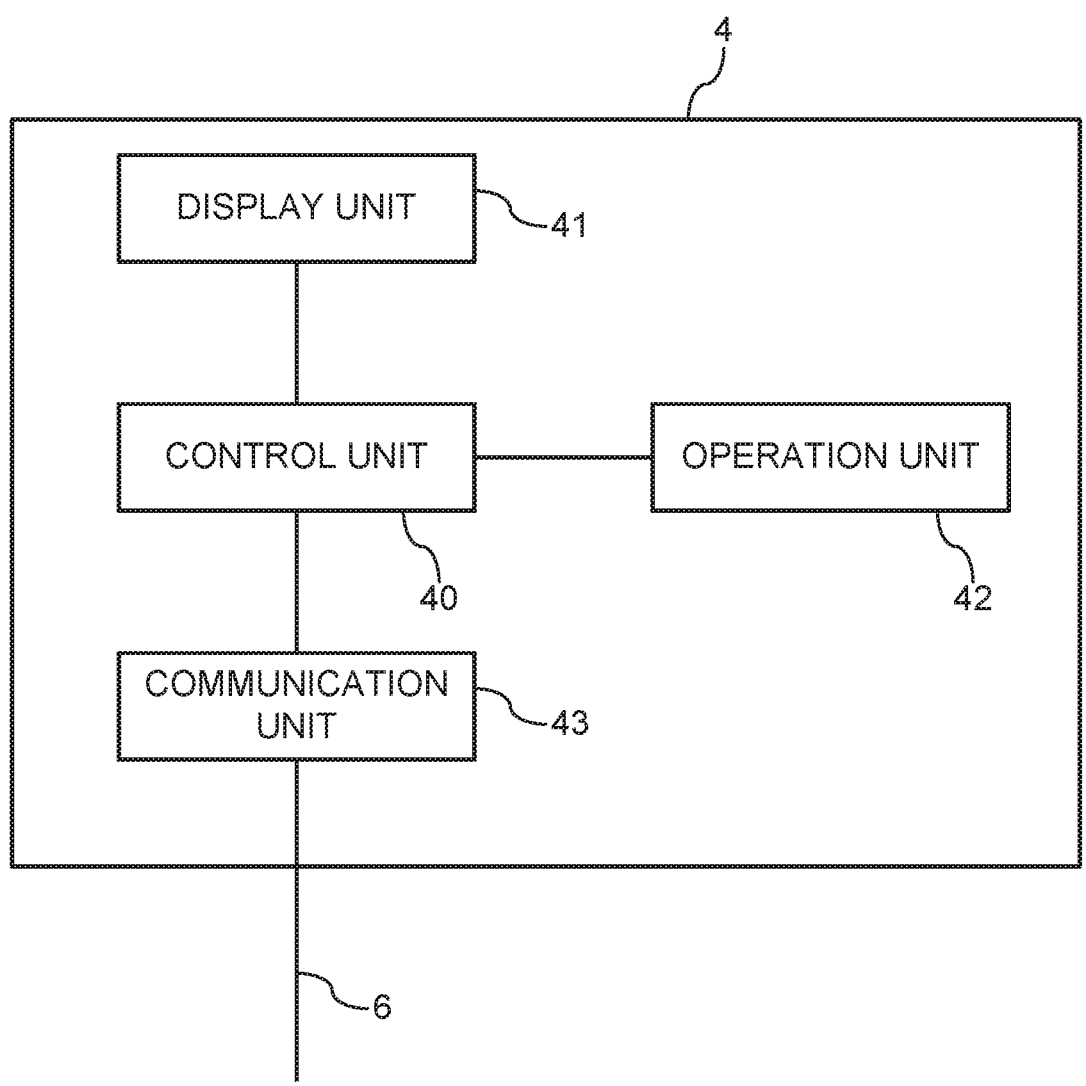
FIG. 14 is a block diagram illustrating the monitoring terminal according to Embodiment 1 of the present disclosure.

A configuration of the monitoring terminal 4 is described with reference to FIG. 14. The monitoring terminal 4 includes (i) a control unit 40 to control the functions of the monitoring terminal 4, (ii) a display unit 41 to display information received from the air-conditioning management device 3, (iii) an operation unit 42 to receive an operation by a user, and (iv) a communication unit 43 to communicate with the air-conditioning management device 3 via the second communication line 6.

The control unit 40 acquires, from the operation unit 42, operation information indicating the user's operation. The control unit 40 receives, from the air-conditioning management device 3 in accordance with the user's operation, information to be displayed on the monitoring terminal 4. For example, when the user's operation is an operation in which the user checks the captured image of the drain pan and the dirtiness degree of the drain pan, the control unit 40 receives, from the air-conditioning management device 3, the captured image information and the information indicating the dirtiness degree. The control unit 40 makes the display unit 41 display the received information. When the control unit 40 makes the display unit 41 display that information, the control unit 40 displays the information, for example, on a user interface screen illustrated in FIGS. 16, 17 and 18. Details of the user interface screen are described later.

The functions of the control unit 40 are realized by, for example, a computer, such as a personal computer, a tablet terminal, a smart phone, a microcontroller or the like, that includes a processor 1001, a memory 1002, an interface 1003, and a real time clock 1004 illustrated in FIG. 4, The processor 1001, the memory 1002, the interface 1003, and the real time clock 1004 are mutually connected by, for example, a bus line. The processor 1001 is, for example, a CPU. The memory 1002 is, for example, RAM and ROM. The interface 1003 is, for example, an I/O port. The control unit 40 is connected to the display unit 41, the operation unit 42, and the communication unit 43 via the interface 1003. The memory 1002 functions as working memory when the processor 1001 executes a process. Also, the memory 1002 stores a control program. The processor 1001 reads and executes the control program stored in the memory 1002 when the monitoring terminal 4 is started. The functions of the control unit 40 are realized by the processor 1001 executing the control program.

A part of or all of the functions of the control unit 40 may be realized by a dedicated circuit using an ASIC, an FPGA or the like.

Referring back to FIG. 14, the display unit 41 includes a display device for displaying information. The display device is, for example, a liquid crystal display. The display unit 41 displays information to be displayed on the monitoring terminal 4 under the control of the control unit 40.

The operation unit 42 includes an input device to receive the user's operation. The input device is, for example, a touchscreen used integrally with a liquid crystal display. The operation unit 42 outputs, to the control unit 40, the operation information indicating the user's operation. The operation information is, for example, information indicating a portion of the touchscreen touched by the user's finger when the user's finger touches the touchscreen. The control unit 40 (i) determines the content of the user's operation based on, for example, the screen displayed on the display unit 41 and the portion touched by the user's finger and (ii) requests the air-conditioning management device 3 to send information depending on the content of the user's operation.

The communication unit 43 (i) receives, from the air-conditioning management device 3, the information to be displayed on the monitoring terminal 4 and (ii) outputs the information to the control unit 40.

The configuration of the air-conditioning management system 1 is as described above. Next, a processing flow from capture of an image of the drain pan to calculation of the dirtiness degree in an operation of the air-conditioning management system 1 is described with reference to FIG. 15.

First, the control unit 30 of the air-conditioning management device 3 stands by until a timing at which the imaging condition indicated by the schedule data 313 is satisfied (step T1). The expression "stands by" here means that the control unit 30 is ready for transmission of the image request command. Therefore, other operations related to control and management of the air conditioner 2 such as a change of an operation mode, a change of a setting temperature, acquisition of an operating state or the like may be performed in parallel.

When the imaging condition indicated by the schedule data 313 is satisfied, the control unit 30 transmits the image request command to the air conditioner 2 (step T2) When the air conditioner 2 receives the image request command, the control unit 20 of the air conditioner 2 controls the camera 22 to capture an image of the drain pan in the air conditioner 2 (step T3). The control unit 20 stores, in the storage unit 21, the captured image information in which information indicating the captured image of the drain pan is associated with the imaging date and time (step T4). The control unit 20 transmits, to the air-conditioning management device 3, the stored captured image information (step T5).

When the air-conditioning management device 3 receives the captured image information, the control unit 30 of the air-conditioning management device 3 stores the captured image information in the drain pan data 312 (step T6). That is, a new record corresponding to the air conditioner 2 is added to the drain pan data 312.

The comparison unit 300 of the control unit 30 (i) compares the captured image included in the received captured image information with the reference image and (ii) calculates the dirtiness degree (step T7). As described above, the reference image is, for example, a captured image in a record in which the reference flag field is enabled in the drain pan data 312. This captured image can be said to be a captured image of the drain pan that (i) is captured immediately after cleaning the drain pan and (ii) is not dirty. Therefore, the reference image is, for example, the captured image of the drain pan as illustrated in FIG. 6.

The method of calculating the dirtiness degree, for example, acquires a difference between the captured image and the reference image for each pixel and calculates the dirtiness degree based on the number of pixels that differ from one another. For example, in the captured images illustrated in FIGS. 6 and 7, there is no difference between an outer portion of a frame of the drain pan illustrated in FIG. 6 versus FIG. 7, On the other hand, since a dirty portion illustrated in FIG. 7 does not exist in the image illustrated in FIG. 6, differences between these images occur. This method can be said to treat as dirt a portion Where there is the difference from the image illustrating the non-dirty state. Also, rather than simply comparing images, a method is conceivable in which each pixel of both the images is binarized in accordance with brightness or darkness and the binarized pixels are compared. The binarization of each pixel enables suppression of differences caused by differences in imaging conditions, adhesion of water and the like.

The control unit 30 stores the dirtiness degree calculated by the comparison unit 300 in the dirtiness degree field of the latest record corresponding to the air conditioner 2 in the drain pan data 312. Additionally, when there is a request from the monitoring terminal 4, the control unit 30 transmits, to the monitoring terminal 4, information indicating the dirtiness degree (step T8).

The processing flow of the operation from capture of an image of the drain pan to calculation of the dirtiness degree is as described above. Next, the display screen and screen transitions during an operation of the monitoring terminal 4 by the user are described with reference to FIGS. 16, 17 and 18. Hereinafter, the monitoring terminal 4 is described by assuming operation by a touchscreen integrated with a liquid crystal display.

When the user operates the monitoring terminal 4 to display a screen for monitoring the drain pan, a list of the air conditioners 2 illustrated, for example, in FIG. 16 is displayed on the liquid crystal display of the display unit 41. In FIG. 16, the air conditioners 2 are divided into groups in accordance with the dirtiness degrees of the drain pans. In FIG. 16, for each of the air conditioners 2, the screen displays, from left to right. (i) the address of the air conditioner 2, (ii) the icon indicating the model type of the air conditioner 2, (iii) the floor on which the air conditioner 2 is installed, and (iv) the name of the room in which the air conditioner 2 is installed, (v) an image check button for displaying the captured image of the drain pan in the air conditioner 2, and (vi) cleaning date and time at which the drain pan is cleaned. In order to display such information on the display unit 41 of the monitoring terminal 4, for example, the control unit 40 of the monitoring terminal 4 acquires such information from the air-conditioning management device 3 immediately before displaying the screen.

By touching an uppermost tier tab of the screen illustrated in FIG. 16, not only the drain pans can be monitored but also the imaging schedule and the operating states of the air conditioners 2 can be checked. By a second tier tab illustrated in FIG. 16, display content can be switched between the list of the air conditioners 2 and the floor plan of the building in which the air conditioners 2 are installed, and the floor plan is illustrated in FIG. 18. In the floor plan illustrated in FIG. 18, the colors of the icons indicating the model types are varied in accordance with the dirtiness degrees of the drain pans. Also, by touching one of the icons indicating the model types, for example, a captured image of a drain pan can be checked. Additionally, although detailed description is omitted, the screen of FIG. 16 can be changed to a screen not illustrated in FIG. 16, such as a setting temperature change screen, for example, by a screen swiping operation.

Figure 17:
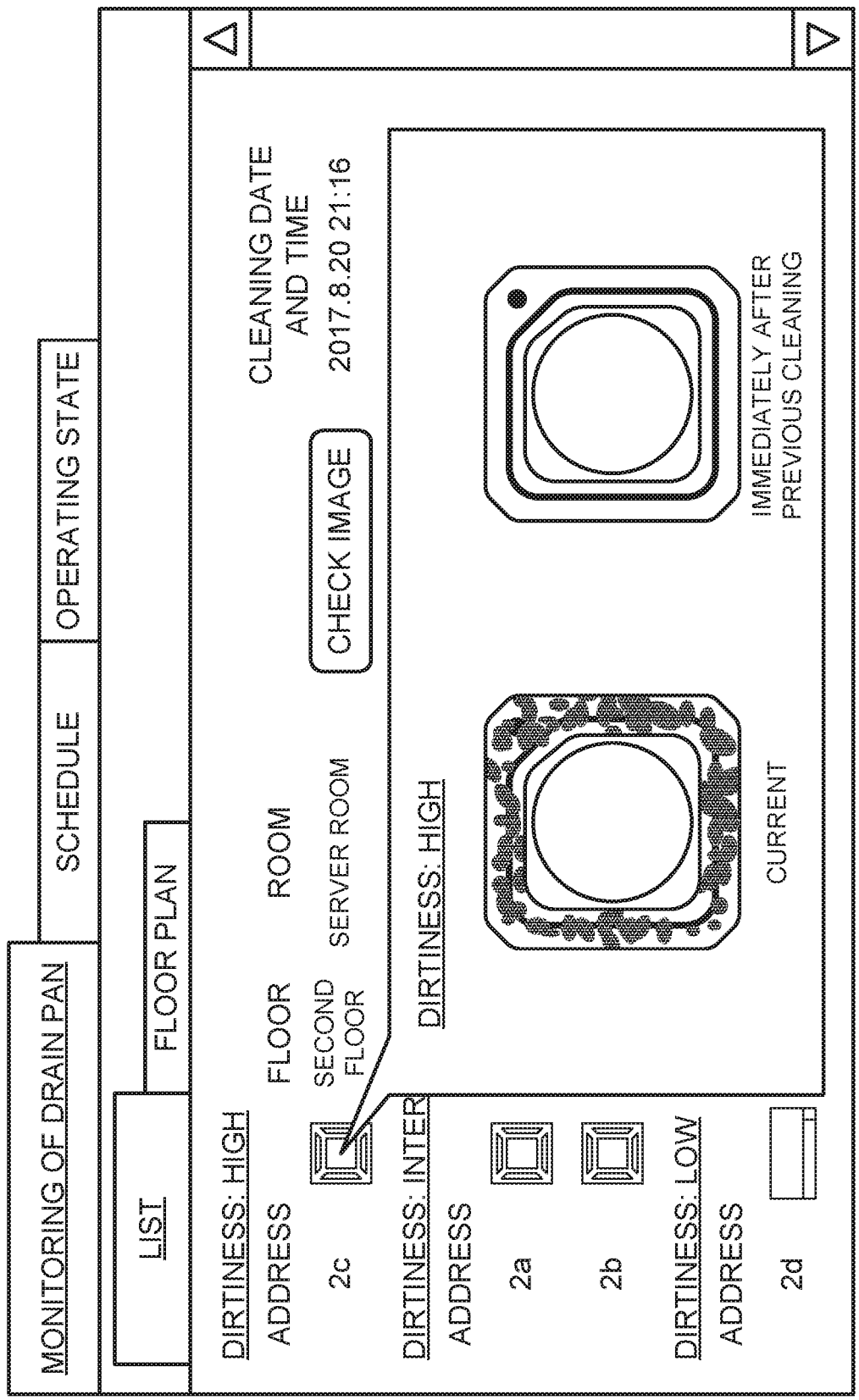
FIG. 17 illustrates one example of an image check screen displayed by the monitoring terminal according to Embodiment 1 of the present disclosure.

When the user touches an image check button illustrated in FIG. 16, as illustrated in FIG. 17, (i) an image of a drain pan captured at the latest imaging date and time and (ii) the reference image that is an image of the drain pan captured immediately after the previous cleaning of the drain pan are displayed side by side. The user can determine whether cleaning of the drain pan is necessary by checking these displayed captured images. For example, when the user touches the image check button, the control unit 40 (i) acquires the captured image and the reference image from the air-conditioning management device 3 and (ii) makes the display unit 41 display the captured image and the reference image.

As illustrated in FIG. 16, since the air conditioner 2 is classified in advance depending on value of the dirtiness degree, for example, there is no need for the user to check the captured image afresh for an air conditioner 2 having a low dirtiness degree, thereby enabling a reduction in inspection cost.

Although the image check button for checking the captured image is displayed in FIG. 16, instead of the image check button, an image obtained by reducing in size the captured image may be displayed. In this case, when the user touches the reduced image, the same image check screen as illustrated in FIG. 17 is displayed.

The display screen described above can be realized, for example, by (i) making the air-conditioning management device 3 have a function of a web server, (ii) installing a web browser on the monitoring terminal 4, and (iii) accessing the web server of the air-conditioning management device 3 by the web browser. Also, the display screen described above can be realized by (i) installing a dedicated air-conditioning management program on the monitoring terminal 4 and (ii) executing the air-conditioning management program.

The air-conditioning management system according to Embodiment 1 is as described above. According to the air-conditioning management system 1, by providing the air conditioner 2 with the camera 22 and capturing an image of the drain pan included in the air conditioner 2 using the camera 22, dirt of the drain pan can be checked without disassembling and inspecting the air conditioner 2, thereby enabling a reduction in inspection cost. Additionally, by making the air-conditioning management device 3 calculate the dirtiness degree, there is no need to visually check a captured image of the drain pan having a low dirtiness degree, thereby enabling a further reduction in inspection cost. As described above, according to the air-conditioning management system 1, inspection of the air conditioners 2 can be supported.

Embodiment 2

Figure 19:
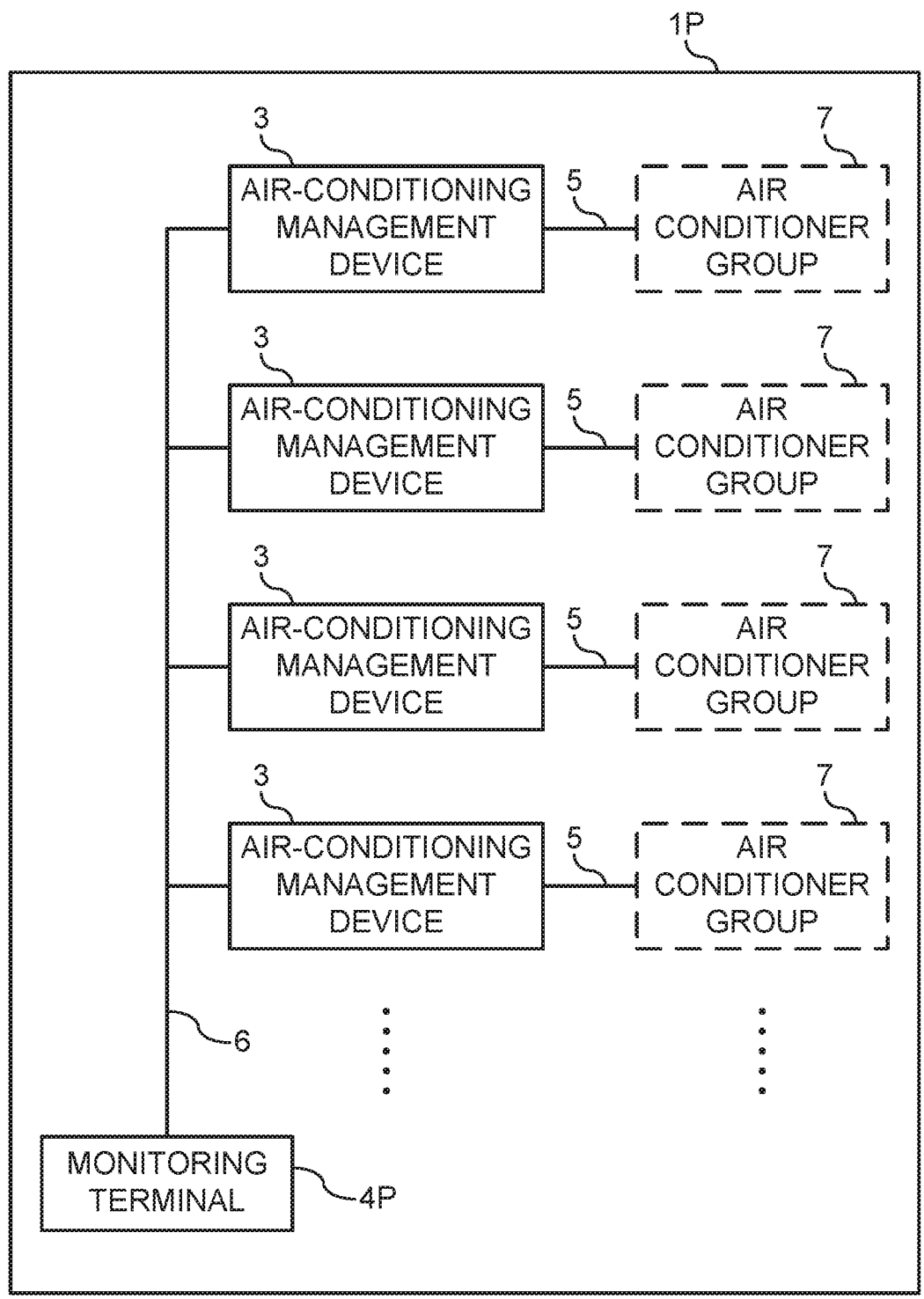
FIG. 19 is a block diagram illustrating an air-conditioning management system according to Embodiment 2 of the present disclosure.

Like the air-conditioning management system 1, an air-conditioning management system 1P according to Embodiment 2 illustrated in FIG. 19 is a system that collectively monitors drain pans in multiple air conditioners 2 installed in a building.

In the configuration of the air-conditioning management system 1P, points of difference from the air-conditioning management system 1 are described with reference to FIG. 19. In FIG. 19, illustration of each of the air conditioners 2 is omitted, and only the air conditioner group 7 is illustrated.

The present embodiment is different from the air-conditioning management system 1 in that multiple air conditioning management devices 3 are connected to a single monitoring terminal 4P. Air-conditioning management devices 3 are installed, for example, on each floor of the building. Such air-conditioning management devices 3 is connected to, for example, the air conditioner group 7 installed on the same floor as the air-conditioning management devices 3.

In a case in which the scale of the building is large and a huge number of air conditioners 2 are installed in the building, multiple air-conditioner management devices 3 for managing the air conditioners 2 are required. According to the air-conditioning management system P, even when there is need to install the multiple air-conditioning management devices 3 in the building, the drain pans in all of the air conditioners 2 can be monitored by the monitoring terminal 4P. Therefore, according to the air-conditioning management system 1P, the inspection of the air conditioners 2 can be supported.

Embodiment 3

Figure 20:
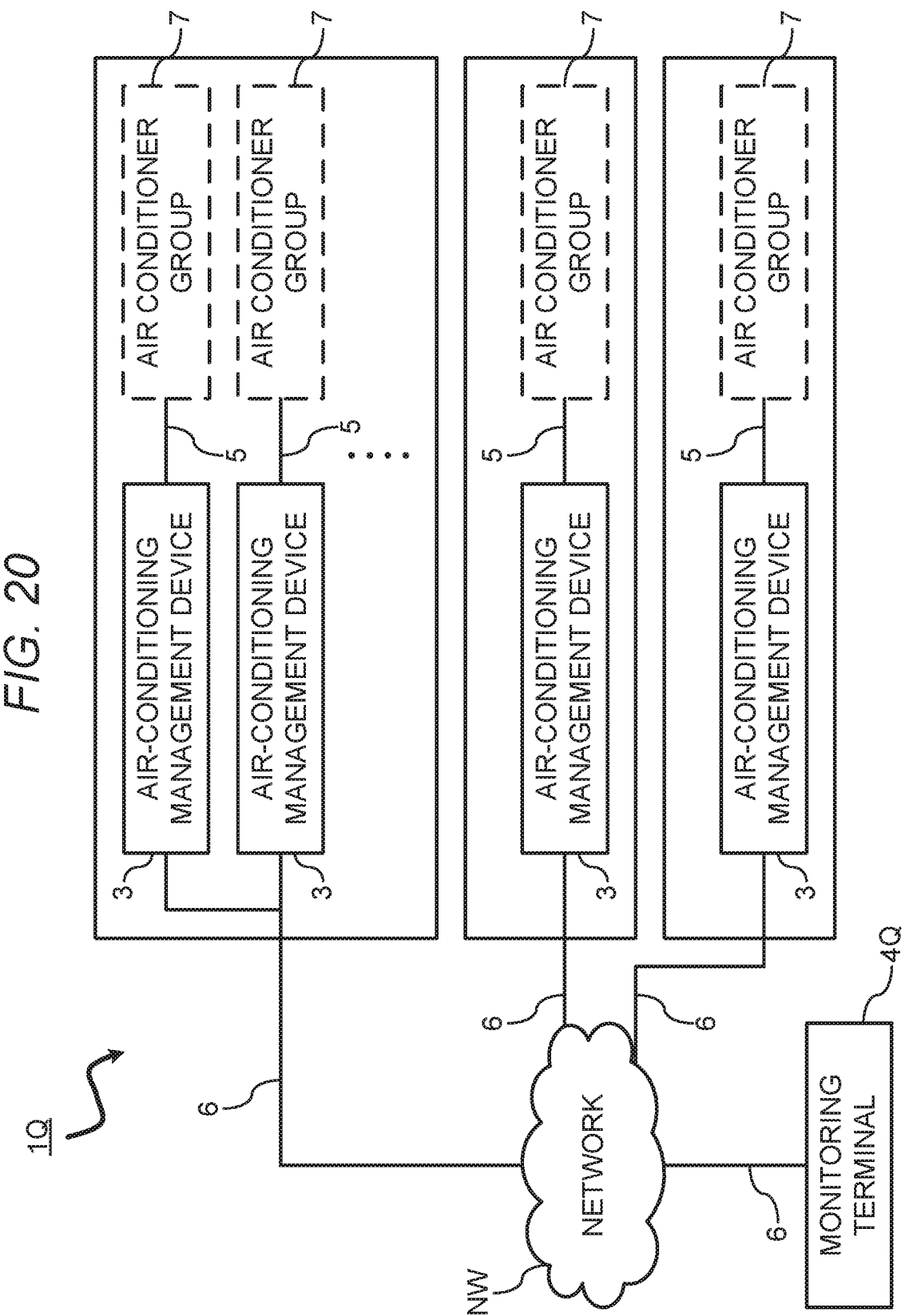
FIG. 20 is a block diagram illustrating an air-conditioning management system according to Embodiment 3 of the present disclosure.

An air-conditioning management system 1Q according to Embodiment 3 illustrated in FIG. 20 is a system that monitors the drain pans in the air conditioners 2 installed in a building via a network NW.

In the configuration of the air-conditioning management system 1Q, points of difference from the air-conditioning management system 1 are described with reference to FIG.

20. In FIG. 20, illustration of each of the air conditioners 2 is omitted, and only the air conditioner group 7 is illustrated.

First, the air-conditioning management system 1Q is different from the air-conditioning management system 1 in that a monitoring terminal 4Q is connected to the air-conditioning management device 3 via the network NW. The network NW is, for example, a local area network (LAN), a wide area network (WAN), the Internet or the like.

Also, as illustrated in FIG. 20, since the monitoring terminal 4Q is connected to the air-conditioning management device 3 via the network NW, the air-conditioning management system 1Q is different from the air-conditioning management system 1 also in that the monitoring terminal 4Q can be connected to another air-conditioning management device 3 installed in a different building.

Although FIG. 20 illustrates multiple buildings and multiple air-conditioning management devices 3, the number of buildings may be one, and the number of the air-conditioning management devices 3 may be one. The monitoring terminal 4Q is connected to the air-conditioning management device 3 via the network NW independently of (i) a building in which the air-conditioning management device 3 is installed and (ii) the number of installed air-conditioning management devices 3.

Figure 21:
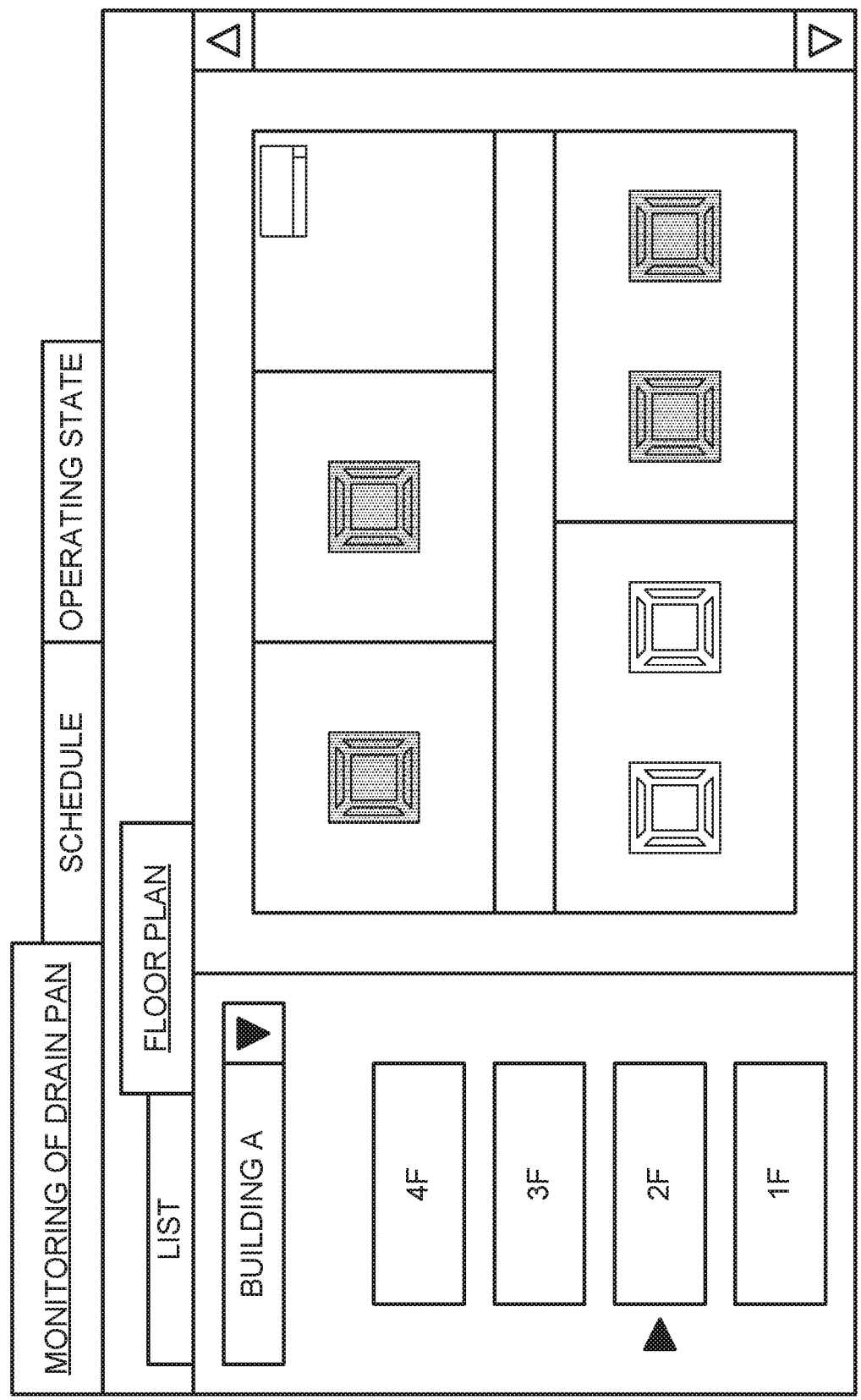
FIG. 21 illustrates one example of a screen image displayed by a monitoring terminal according to Embodiment 3 of the present disclosure.

Since the monitoring terminal 4Q can monitor the drain pans in the air conditioners 2 of multiple buildings, the screen displayed on the monitoring terminal 4Q can be different from that of the monitoring terminal 4. For example, as illustrated in FIG. 21, on the screen displaying the floor plan, a screen image provided with a user interface for selecting a building to be displayed can be displayed on the monitoring terminal 4Q. Also, on the screen illustrated in FIG. 21, a user interface for selecting a floor is also provided.

As described above, according to the air-conditioning management system 1Q, the monitoring terminal 4Q is connected to the air-conditioning management device 3 via the network NW, thereby enabling collective monitoring of the drain pans in the air conditioners 2 installed in remote locations. Therefore, according to the air-conditioning management system 1Q, the inspection of the air conditioners 2 can be supported.

Embodiment 4

Figure 22:
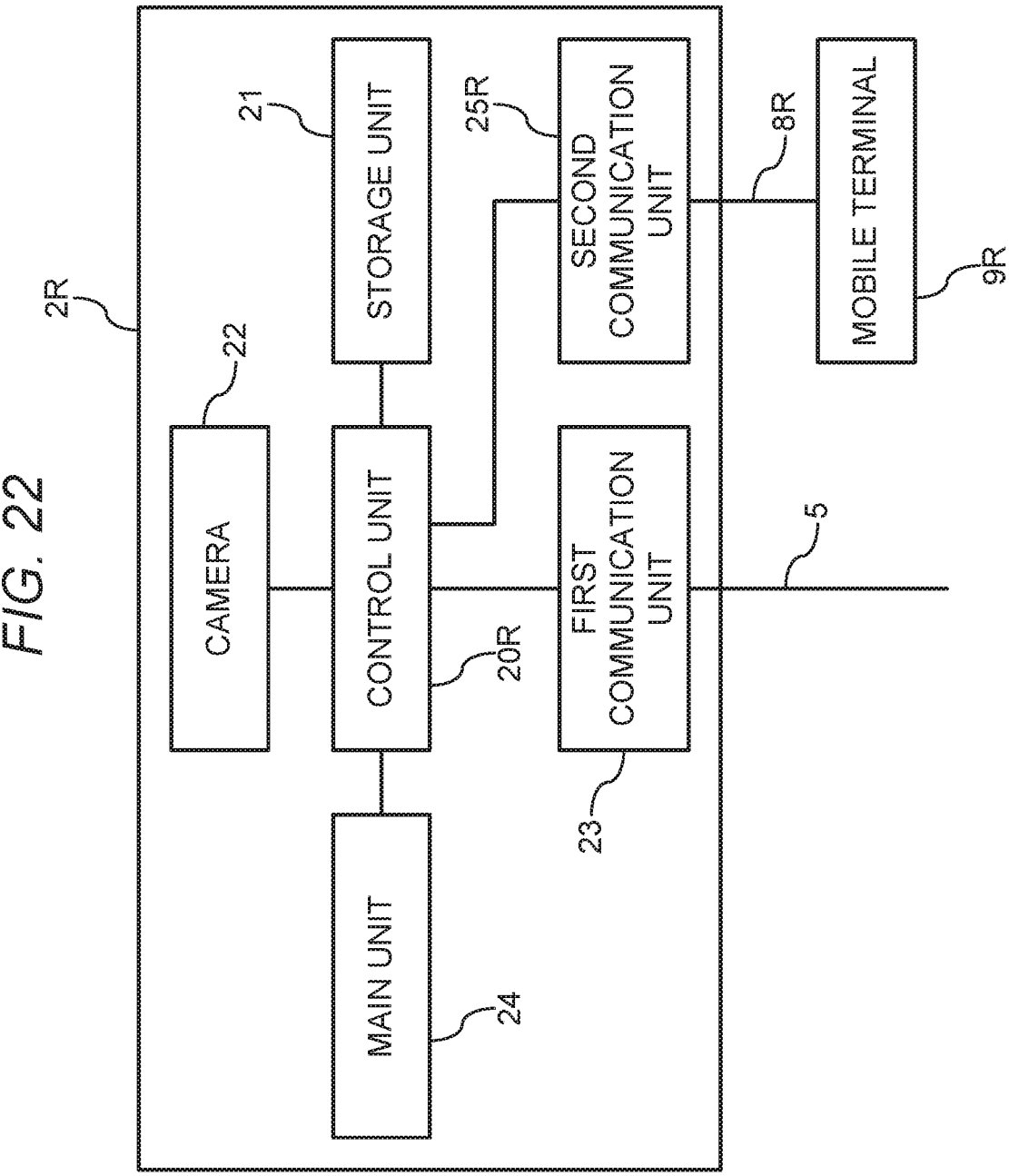
FIG. 22 is a block diagram illustrating an air conditioner according to Embodiment 4 of the present disclosure.

An air conditioner 2R according to Embodiment 4 illustrated in FIG. 22 is an air conditioner that allows a user to use a mobile terminal 9R to check a captured image of a drain pan in the air conditioner 2R.

In the configuration of the air conditioner 2R, points of difference from the air conditioner 2 are described below with reference to FIG. 22. The air conditioner 2R further includes a second communication unit 25R. A control unit 20R is also connected to the second communication unit 25R. The second communication unit 25R is connected to the mobile terminal 9R via a communication channel 8R. Although the first communication unit 23 and the first communication line 5 are displayed in FIG. 22, these components may be omitted. That is, the air conditioner 2R may be configured such that the air conditioner 2R is not connected to the air-conditioning management device 3.

The mobile terminal 9R is, for example, a smartphone or a tablet terminal. The communication channel 8R is a communication channel formed by wireless communication, for example, such as IEEE 802.11 or IEEE 802.15. A dedicated program for checking a captured image of the drain pan in the air conditioner 2R is installed in the mobile terminal 9R. The mobile terminal 9R executes the dedicated program to transmit an image request command to the air conditioner 2R.

The control unit 20R (i) controls the camera 22 in accordance with the image request command received via the second communication unit 25R and (ii) captures an image of the drain pan. The control unit 20R transmits the captured image information to the mobile terminal 9R via the second communication unit 25R.

The mobile terminal 9R displays the captured image of the drain pan based on the captured image information received from the air conditioner 2R by executing the dedicated program. The user of the mobile terminal 9R can determine whether cleaning of the drain pan is necessary by checking the captured image of the drain pan.

According to the air conditioner 2R, for example, in a case in which a worker is in a room in which the air conditioner 2R is installed, the worker can check dirt of the drain pan without going to a room in which the monitoring terminal 4 is installed and without disassembling and inspecting the air conditioner 2R. Also, the worker can check dirt of the drain pan without the necessity of the air-conditioning management device 3 and the monitoring terminal 4. Therefore, according to the air conditioner 2R, the inspection of the air conditioner 2R can be supported.

Also, in a case in which the air conditioner 2R is a home air conditioner, the air-conditioning management device 3 and the monitoring terminal 4 are difficult to install in the home. Additionally, since the user of the air conditioner 2R usually does not have the skill to disassemble the air conditioner 2R, the user cannot disassemble and inspect the drain pan. Also in this case, according to the air conditioner 2R, the user can request a cleaning company to clean the drain pan at appropriate timing by checking the dirt of the drain pan using the mobile terminal 9R. Therefore, also in this case, according to the air conditioner 2R, the inspection of the air conditioner 2R can be supported.

The above-described air conditioner 2R can be said to be an air conditioner including (i) imaging means that captures an image of a drain pan and (ii) image output means that outputs information indicating an image captured by the imaging means. The control unit 20R controls the camera 22 to realize the functions of the imaging means, and the control unit 20R transmits the captured image information to the mobile terminal 9R to realize the functions of the image output means.

Modified Example

In Embodiments 1 to 3, the air-conditioning management device 3 may be configured to (i) further include a display unit and an operation unit, (ii) be operated by a user using the operation unit of the air-conditioning management device 3, and (iii) allow the user to monitor a drain pan using the display unit of the air-conditioning management device 3. That is, the air-conditioning management device 3 may be configured to have the functions of the display unit 41 and the functions of the operation unit 42 of the monitoring terminal 4. In this configuration, the control unit 30 of the air-conditioning management device 3 causes the display unit to display the dirtiness degree, thereby realizing the functions of the dirtiness information output means.

In Embodiments 1 to 3, the air-conditioning management device 3 may have a structure in which the comparison unit 300 is omitted from the control unit 30 of air-conditioning management device 3, so that the air-conditioning management device 3 does not calculate the dirtiness degree. Also in such configuration, since the air-conditioning management device 3 can transmit the captured image information to the monitoring terminal 4, the user can check dirt of the drain pan by checking the captured image of the drain pan displayed on the monitoring terminal 4. In this configuration, the captured image itself can be said to be the dirtiness information indicating the dirt of the drain pan. Therefore, in this configuration, the control unit 30 transmits, to the monitoring terminal 4, the captured image information that is the dirtiness information, thereby realizing the functions of the dirtiness information output means. The air-conditioning management device 3 may transmit, to the monitoring terminal 4, the reference image information together with the captured image information, and the monitoring terminal 4 may display the captured image and the reference image, such configuration, the user can easily check the dirt of the drain pan.

In Embodiments 1 to 3, the air-conditioning management device 3 may be configured to notify the user that the dirtiness degree becomes equal to or greater than a threshold when the dirtiness degree of the drain pan in the air conditioner 2 becomes equal to or greater than the threshold. For example, when the dirtiness degree becomes "high", the user is notified to such effect. In order to realize notification to the user, for example, the air-conditioning management device 3 transmits, to the monitoring terminal 4, notification that the dirtiness degree is equal to or higher than the threshold, and the monitoring terminal 4 makes the display unit 41 indicate that the dirtiness degree is equal to or higher than the threshold. Alternatively, the air-conditioning management device 3 may be configured to transmit such notification to a mobile terminal owned by the user via an email, short message service (SMS) or the like by connecting the air-conditioning management device 3 to the Internet.

Figure 23:
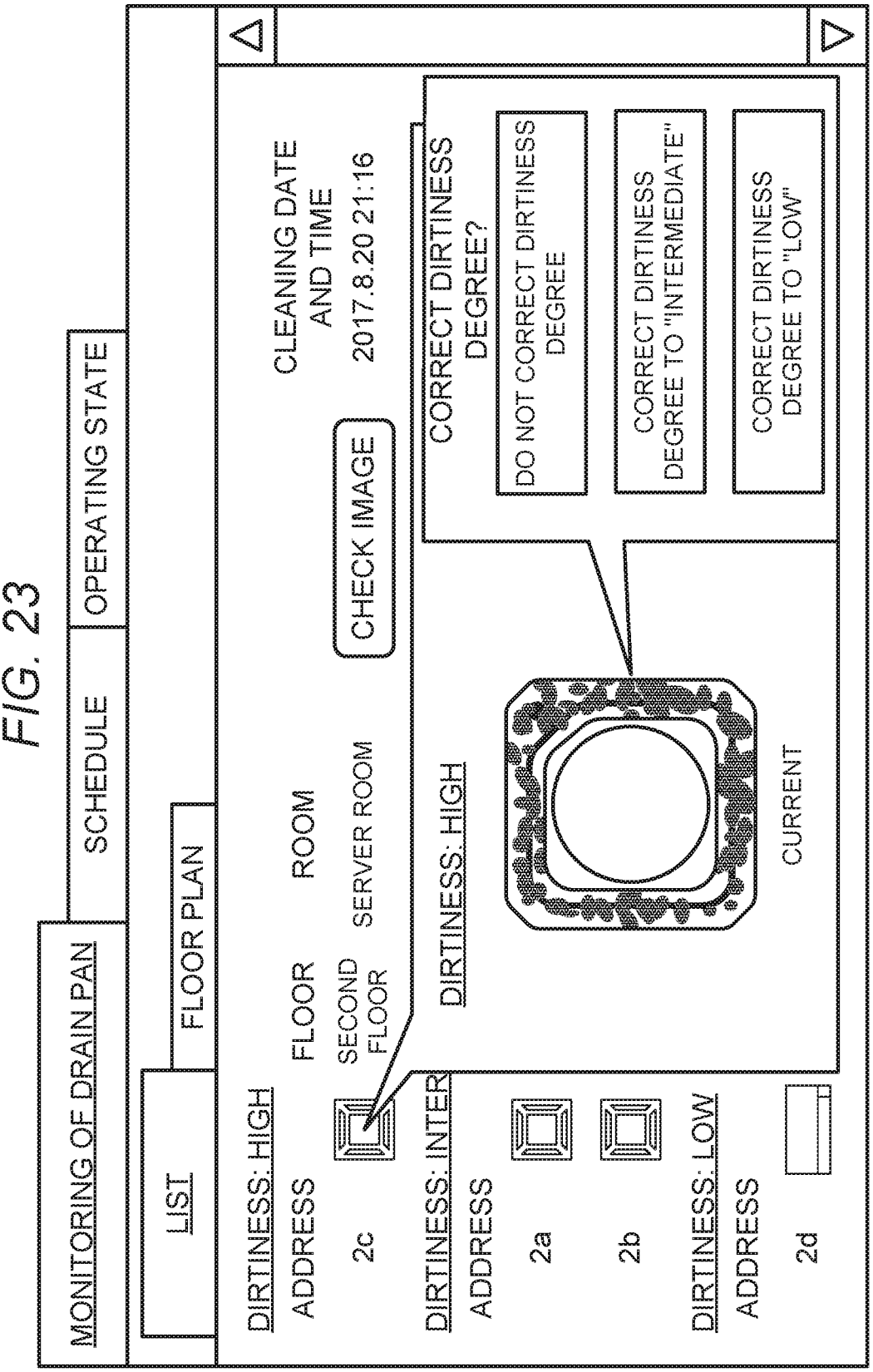
FIG. 23 illustrates one example of a dirtiness degree modification screen image displayed by a monitoring terminal according to a modified example of the present disclosure.

In Embodiments 1 to 3, the air-conditioning management device 3 may be configured to (i) allow the user to correct the dirtiness degree calculated by the air-conditioning management device 3 and (ii) improve, based on the correction result, calculation of the dirtiness degree. Hereinafter, such configuration is described with reference to FIGS. 17 and 23 by providing an example. When the screen illustrated in FIG. 17 is displayed on the display unit 41 of the monitoring terminal 4, the user touches an image of the drain pan to transition to a screen illustrated in FIG. 23 for correcting the dirtiness degree. The user (i) looks at the captured image to determine the dirtiness degree and (ii) touches a button for correcting the dirtiness degree as necessary, thereby enabling correction of the dirtiness degree calculated by the air-conditioning management device 3. For example, when the user corrects the dirtiness degree to "intermediate", the control unit 30 of the air-conditioning management device 3 corrects the dirtiness degree field of the corresponding drain pan data 312 to "intermediate". In addition, the comparison unit 300 changes a method of calculating the dirtiness degree based on the correction by the user. For example, in the case in which the comparison unit 300 compares the captured image with the reference image and sets the dirtiness degree to "high" when the number of differing pixels is equal to or greater than the threshold, the comparison unit 300 changes a value of the threshold based on the user's correction. By changing the method of calculating the dirtiness degree, the result of calculation of the dirtiness degree by the comparison unit 300 and the dirtiness degree determined by the user are made to easily coincide. That is, the user correction can teach the calculation of the dirtiness degree.

Some municipalities stipulate that, for multiple air conditioners operating under the same environment, a drain pan of a single air conditioner may be inspected without inspecting drain pans of the other air conditioners, so that the state of the drain pans is determined without inspection. The above-described phrase, "under the same environment", means that, for example, (i) the air conditioners are installed on the same floor, (ii) operating periods are the same or close to one another, and (iii) the models are the same.

Therefore, in Embodiments 1 to 3, the control unit 30 of the air-conditioning management device 3 may be configured to (i) identity the air conditioners 2 operating under the same environment, (ii) monitor only a drain pan of one of the identified air conditioners 2, (iii) omit monitoring drain pans of the others of the identified air conditioners 2, and (iv) transmit, to the monitoring terminal 4, a dirtiness degree of the drain pan of the monitored air conditioner 2 as dirtiness degrees of the drain pans of the others of the identified air conditioners 2. Since the cameras 22 are unnecessary for the air conditioners 2 for which monitoring of the drain pans is omitted, cost can be reduced.

Figure 2:
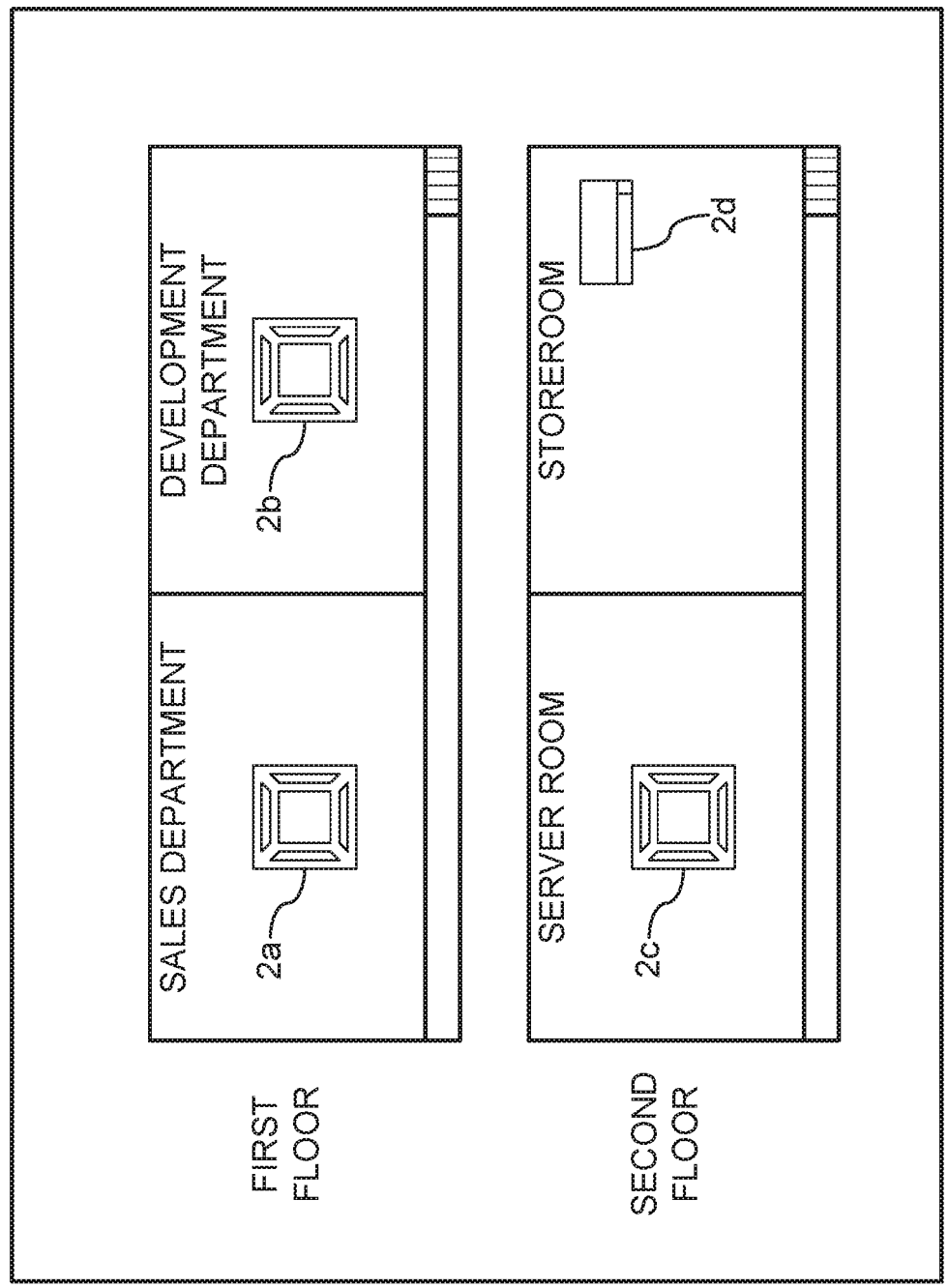
FIG. 2 is a diagram illustrating one example of room configuration of a building according to Embodiment 1 of the present disclosure.

For example, the installation positions of the air conditioners 2 in the building are assumed to be as illustrated in FIG. 2, the air conditioner 2a and the air conditioner 2b are assumed to be the same model, and the operating period data 310b is assumed to be as illustrated in FIG. 10. In this case, the air conditioner 2a and the air conditioner 2b are installed on the same floor. The air conditioner 2a and the air conditioner 2b have the same operating period of 823 hours. In addition, although there are slight differences between the air conditioners 2a and 2b in the cooling operation time and the heating operation time, these times can be said to be almost the same. Therefore, the control unit 30 identifies the air conditioner 2a and the air conditioner 2b as air conditioners 2 that operate under the same environment. The control unit 30 (i) monitors only the drain pan in the air conditioner 2a and (ii) omits monitoring of the drain pan in the air conditioner 2b. Additionally, the control unit 30 transmits, to the monitoring terminal 4, a dirtiness degree of the air conditioner 2a as a dirtiness degree of the air conditioner 2b.

In such configuration, the dirtiness information output means of the air-conditioning management device 3 can be said to output, as dirtiness information of the second air conditioners operating under the same environment, the dirtiness information based on the captured image information acquired from the air conditioner 2. The control unit 30 (i) identifies air conditioners 2 operating under the same environment and (ii) transmits, to the monitoring terminal 4, the dirtiness degree of the drain pan of the monitored air conditioner 2 as the dirtiness degree of the drain pans of the others of the identified air conditioners 2, thereby realizing the functions of the dirtiness information output means.

In Embodiments 1 to 3, the air conditioner 2 may be configured to (i) further include a second sensor that is used for detecting dirt of the drain pan in the air conditioner 2 and is different from the camera 22 and (ii) use the captured image information and information detected by the second sensor to calculate the dirtiness degree. For example, an odor sensor is provided inside the air conditioner 2, and when the odor sensor detects a strong odor, the dirtiness degree is increased. Such configuration makes the calculation of the dirtiness degree more accurate.

In Embodiment 4, the reference image information may be stored in the storage unit 21, the control unit 20R may be provided with the comparison unit, the comparison unit may be configured to compare the captured image with the reference image to calculate the dirtiness degree of the drain pan in the air conditioner 2R, and the control unit 20R may be configured to transmit the dirtiness degree to the mobile terminal 9R. Also, in this configuration, the air conditioner 2R may be provided with a display unit, and the control unit 20R may display the dirtiness degree on the display unit. The display unit is, for example, a lamp that is placed on the front of the air conditioner 2R and changes in color in accordance with the dirtiness degree. The user can request the cleaning company to clean the drain pan at an appropriate timing by checking the display unit of the mobile terminal 9R or the air conditioner 2R. In this configuration, the air conditioner 2R can be said to include the dirtiness information output means that outputs dirtiness information based on the image captured by the imaging means. The comparison unit compares the captured image with the reference image to calculate the dirtiness degree, and the control unit 20R transmits the dirtiness degree to the mobile terminal 9R or the control unit 20R, makes the display unit display the dirtiness degree, thereby realizing the functions of the dirtiness information output means.

Various programs used for the air conditioners 2, the air-conditioning management device 3, the monitoring terminal 4 and the mobile terminal 9R are stored in a computer readable recording medium such as compact disc read only memory (CD-ROM), a digital versatile disc (DVD), a magneto-optical disc, universal serial bus (USB) memory, a memory card, a hard disk drive (HDD) and the like, the computer readable recording medium is distributed, and the programs are installed on a specific or general-purpose computer, thereby enabling the computer to function as the air conditioner 2, the air-conditioning management device 3, the monitoring terminal 4, and the mobile terminal 9R.

Also, the various programs described above may be stored in a disk device or the like included in another server on the Internet in advance, and the various programs described above may be downloaded from the other server.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The present disclosure is advantageous for management of air conditioners.

REFERENCE SIGNS LIST 1, 1P, 1Q Air-conditioning management system
2, 2a, 2b, 2c, 2d, 2R Air conditioner
3 Air-conditioning management device
4, 4P, 4Q Monitoring terminal
5 First communication line
6 Second communication line
7 Air conditioner group
8R Communication channel
9R Mobile terminal
20, 20R Control unit
21 Storage unit
22 Camera
23 First communication unit
25R Second communication unit
30 Control unit
31 Storage unit
32 First communication unit
33 Second communication unit
40 Control unit
41 Display unit
42 Operation unit
43 Communication unit
300 Comparison unit
310 Operation data
310a Operating state data
310b Operating period data
311 Configuration data
312 Drain pan data
313 Schedule data
1001 Processor
1002 Memory
1003 Interface
1004 Real time clock
NW Network

The invention claimed is:

1. An air-conditioning management system comprising:
an air conditioner; and
an air-conditioning management device, wherein
the air conditioner operates under control of the air-conditioning management device,
the air conditioner comprises:
a drain pan;
a camera; and
an air conditioner processor configured to
control the camera to capture an image of the drain pan; and
transmit captured image information indicating the image captured by the camera to the air-conditioning management device, and
the air-conditioning management device comprises:
an air-conditioning management device processor configured to
acquire, from the air conditioner via communication, the captured image information indicating the image captured by the camera;
determine, based on the captured image information, dirtiness information indicating a dirtiness degree corresponding to the drain pan; and
output the captured image information and the dirtiness information based on the captured image information.

2. The air-conditioning management system according to claim 1, wherein
the air-conditioning management device further comprises a storage configured to store reference image information indicating a reference image of the drain pan as a reference, and
the air-conditioning management device processor is configured to
calculate the dirtiness degree based on a comparison of the captured image information and the reference image information, and
output the dirtiness information including the dirtiness degree based on a result of the comparison between the captured image information and the reference image information.

3. The air-conditioning management system according to claim 2, wherein
the air-conditioning management device processor is further configured to
perform a comparison to compare the captured image information with the reference image information and determine whether a number of pixels in which the captured image information is different from the reference image information is equal to or greater than a threshold,
change a value of the threshold based on a user correction, and
output the dirtiness information based on a result of the comparison.

4. The air-conditioning management system according to claim 1, wherein
the air-conditioning management device processor is configured to determine, based on the captured image information, a necessity of cleaning the drain pan and outputs, as the dirtiness information, information regarding the necessity of cleaning the drain pan.

5. The air-conditioning management system according to claim 1, further comprising:
a second air conditioner configured to operate under a same environment as the air conditioner operates, wherein
the air-conditioning management device processor is configured to output, as dirtiness information of the second air conditioner, dirtiness information based on the captured image information acquired from the air conditioner.

6. The air-conditioning management system according to claim 1, wherein the air-conditioning management device processor is further configured to notify a terminal of the dirtiness information.

7. The air-conditioning management system according to claim 1, further comprising a monitoring terminal having a monitoring terminal processor configured to
receive an operation by which a setting for an imaging schedule of the drain pan is changed, and
transmit the setting for the imaging schedule responsive to being changed to the air-conditioning management device,
wherein the air-conditioning management device processor is further configured to transmit an image request command that requests a captured image of the drain pan, to the air conditioner based on the imaging schedule.

8. An air conditioner comprising:
a drain pan;
a camera; and
an air conditioner processor configured to
control the camera to capture an image of the drain pan;
determine, based on the captured image information, dirtiness information indicating a dirtiness degree corresponding to the drain pan; and
output the image captured by the imager and the dirtiness information based on the captured image.

9. The air conditioner according to claim 8, further comprising
a storage configured to store reference image information indicating a reference image of the drain pan as a reference, wherein
the air conditioner processor is configured to
calculate the dirtiness degree based on a comparison of the captured image information and the reference image information, and
output the dirtiness information including the dirtiness degree based on a result of the comparison between the captured image information and the reference image information.

10. The air conditioner according to claim 9, wherein
the air conditioner processor is further configured to
perform a comparison to compare the captured image information with the reference image information and determine whether a number of pixels in which the captured image information is different from the reference image information is equal to or greater than a threshold,
change a value of the threshold based on a user correction, and
output the dirtiness information based on a result of the comparison.

11. The air conditioner according to claim 8, wherein
the air conditioner processor is configured to determine, based on the captured image information, a necessity of cleaning the drain pan and outputs, as the dirtiness information, information regarding the necessity of cleaning the drain pan.

12. The air conditioner according to claim 8, wherein the air conditioner processor is further configured to notify a terminal of the dirtiness information.

13. An air-conditioning management device comprising:
an air-conditioning management device processor configured to
acquire captured image information indicating a captured image of a drain pan included in an air conditioner;
determine, based on the captured image information, dirtiness information indicating a dirtiness degree corresponding to the drain pan; and
output the captured image information and the dirtiness information based on the captured image information.

14. The air-conditioning management device according to claim 13, further comprising
a storage configured to store reference image information indicating a reference image of the drain pan as a reference, and
the air-conditioning management device processor is configured to
calculate the dirtiness degree based on a comparison of the captured image information and the reference image information, and
output the dirtiness information including the dirtiness degree based on a result of the comparison between the captured image information and the reference image information.

15. The air-conditioning management device according to claim 14, wherein
the air-conditioning management device processor is further configured to
perform a comparison to compare the captured image information with the reference image information and determine whether a number of pixels in which the captured image information is different from the reference image information is equal to or greater than a threshold,
change a value of the threshold based on a user correction, and
output the dirtiness information based on a result of the comparison.

16. The air-conditioning management device according to claim 13, wherein
the air-conditioning management device processor is configured to determine, based on the captured image information, a necessity of cleaning the drain pan and outputs, as the dirtiness information, information regarding the necessity of cleaning the drain pan.

17. The air-conditioning management device according to claim 13, wherein the air-conditioning management device processor is further configured to notify a terminal of the dirtiness information.

\* \* \* \* \*